US008616052B1

(12) United States Patent
Kia et al.

(10) Patent No.: US 8,616,052 B1
(45) Date of Patent: Dec. 31, 2013

(54) SYSTEM AND METHOD OF VISUALIZATION OF SPECIES CHARACTERIZATION, DYNAMICS AND STRATIFICATION OF THE MAGNETOSPHERE

(75) Inventors: Omid E. Kia, North Bethesda, MD (US); Christopher T. Rodgers, Adamstown, MD (US)

(73) Assignee: Exelis, Inc., McLean, VA (US)

( * ) Notice: Subject to any disclaimer, the term of this patent is extended or adjusted under 35 U.S.C. 154(b) by 571 days.

(21) Appl. No.: 12/975,773

(22) Filed: Dec. 22, 2010

Related U.S. Application Data

(63) Continuation-in-part of application No. 12/902,481, filed on Oct. 12, 2010.

(51) Int. Cl.
*G01W 1/00* (2006.01)
(52) U.S. Cl.
USPC ............................................. 73/170.16; 702/3
(58) Field of Classification Search
None
See application file for complete search history.

(56) References Cited

U.S. PATENT DOCUMENTS

| 5,673,366 | A | | 9/1997 | Maynard et al. | |
|---|---|---|---|---|---|
| 5,796,611 | A | * | 8/1998 | Ochiai et al. ....................... | 702/3 |
| 5,943,629 | A | * | 8/1999 | Ballard et al. ...................... | 702/2 |
| 6,023,223 | A | * | 2/2000 | Baxter, Jr. ...................... | 340/531 |
| 6,104,582 | A | * | 8/2000 | Cannon et al. ..................... | 361/1 |
| 6,581,008 | B2 | * | 6/2003 | Intriligator et al. ................ | 702/3 |
| 6,816,786 | B2 | * | 11/2004 | Intriligator et al. ................ | 702/3 |
| 7,096,121 | B2 | | 8/2006 | Intriligator et al. | |

OTHER PUBLICATIONS

Lanphear, Jeffrey D. Maj. USAF; and Medina, Gabriel A. Maj, Dominican Republic Air Force, "Space Environment", Air University Press, Maxwell Air Force Base, Alabama, Sep. 2009, Chapter 7, pp. 115-136.
Kinkela, Shauna M., Estimating Equatorial F-Region Daytime Vertical E X B Drift Velocites From Ground-Based Magnetometer Measurements in the Philippine Longitude Sector, Air Force Institute of Technology, Wright-Patterson Air Force Base, Ohio, Jun. 2004, pp. 1-85.
Hapgood, Mike and Oliver, Mike, "A Definition of Instruments Needed for Space Weather Measurements", ESA Space Weather Study, ESWS-RAL-TN-0001, Issue 1.4, CLRC Rutherford Appleton Laboratory, Nov. 18, 2001.
Russell, C.T., "The Solar Wind Interaction With the Earth'S Magnetosphere: A Tutorial," Plasma Science, IEEE Transaction, vol. 2, Issue 6, Dec. 2000, pp. 1818-1830.
Russell, C.T., "The Magnetosphere," Annual Review Inc., Earth Planet, California, 1991, pp. 169-182.

(Continued)

*Primary Examiner* — Lisa Caputo
*Assistant Examiner* — Jermaine Jenkins
(74) *Attorney, Agent, or Firm* — Ratnerprestia

(57) ABSTRACT

A system for identifying at least one species in space includes a physical response module for outputting multiple spectral data based on received signals from a target in space; a calibration module for receiving the spectral data and outputting a first dataset, including density of an {x, y, z} coordinate location in space as a function of time, t; and a classification module for receiving the first dataset, and outputting a second dataset including multiple tuples of {x, y, z, t, d} associated with the at least one species, wherein d is density of the at least one species. Also included is an HD processor for receiving the second dataset from the classification module and providing a visual image of the second dataset to a user.

20 Claims, 19 Drawing Sheets

(56) References Cited

OTHER PUBLICATIONS

Redorbit News, "Alaska Radar System Aids Research on Space Weather, Solar Storms;"http://www.redorbit.com/news.display/?id=1698772, Jun. 2, 2009.

V. Lakshmanan, V. Debrunner, R. Rabin, Texture-Based Segmentation of Satellite Weather Imagery, National Severe Storms Laboratory, U. of Oklahoma, U. of Wisconsin, Madison, *Image Processing, 2000. Proceedings. 2000 International Conference on*, Issue Date: Sep. 10-13, 2000 ,pp. 732-735 vol. 2.

E. Bratsolis, M. Sigelle, "Solar Image Segmentation by Use of Mean Field Fast Annealing,"Astronomy & Astrophysics Supplement Series, 131, 371-375, Aug. 1998.

Rick Archibald, Jiuxiang Hu, Anne Gelb and Gerald Farin; "Improving the Accuracy of Volumetric Segmentation Using Pre-Processing Boundary Detection and Image Reconstruction", IEEE Transactions of Image Processing, vol. XX, No. Y, Month 2003.

\* cited by examiner

SYSTEM AND METHOD OF VISUALIZATION OF SPECIES CHARACTERIZATION, DYNAMICS AND STRATIFICATION OF THE MAGNETOSPHERE

CROSS REFERENCE TO RELATED APPLICATIONS

This application is a continuation-in-part of U.S. patent application Ser. No. 12/902,481, filed Oct. 12, 2010. The entire contents of that application is expressly incorporated herein by reference.

TECHNICAL FIELD

The present invention relates, in general, to systems and methods for characterizing the Earth's magnetosphere. More specifically, the present invention relates to gathering sufficient data, by way of a laser induced fluorescence detection and ranging (LIFDAR) technique and other techniques, to allow for the visualization of species in the magnetosphere, their dynamics, stratification and their geo-location around the globe.

BACKGROUND OF THE INVENTION

The Earth's magnetosphere occupies a region of space in which the Earth's magnetic field dominates the pressure exerted by the solar wind flowing outwardly from the sun. The solar wind includes constantly radiating enormous amounts of energy across the entire electromagnetic spectrum. In addition, the solar wind includes a steady stream of charged particles, such as protons, electrons and neutrons. The magnetosphere is the Earth's geomagnetic field.

The magnetosphere is partially flattened on the sunlit side of the Earth, flattened directly from the pressure applied to the magnetosphere by the solar wind. On the side of the Earth opposite that facing the sun, however, the geomagnetic field is stretched out, past the Earth, for millions of miles. On the sunlit side of the Earth, the geomagnetic field extends past the Earth for less than ten Earth radii.

Adding to the normal energy output from the sun, there are periodic and random solar activities that result in massive increases in ambient energy. The prime events in solar activities are the coronal mass ejection (CME) and the solar flare. A large CME may contain 10 billion tons of matter that is accelerated to several million miles per hour. A solar flare is an explosive release of energy including electromagnetic and charged particles. The energy released is substantial and may be equal to the simultaneous detonation of a trillion five-megaton nuclear weapons.

The Earth's magnetic field deflects some of the solar particles, but at some locations on the Earth, such as above the polar caps, the solar particles interact with the near-Earth environment. However, when strong solar winds sweep past the Earth, they cause shockwaves to ripple through the magnetosphere.

Geomagnetic storms cause rapid fluctuations in the Earth's magnetic field and increase the amount of ionized particles impinging on the Earth's ionosphere. These rapid fluctuations may cause failure of power grids on the Earth, orientation errors in navigation systems relying on magnetic compasses, and sporadic or total blackouts of communication systems. In addition, satellites relying on optical sensors to gaze at stars to maintain orientation in space may be vulnerable to cosmic rays and high-energy protons. These energy protons may produce flashes of light, causing false-star detection and attitude errors with respect to the Earth.

Furthermore, a geomagnetic storm or proton event may physically damage a launch vehicle or its payload. The electrostatic charge deposited on the vehicle may be discharged by onboard electrical activity, such as vehicle commands from a flight control system. In fact, with newer microelectronics and their lower operating voltages, it is actually easier to cause electrical upsets than on older, simpler vehicles.

Due to limitations in available data, such as stratification of ionized species and their dynamics, very little has been done to effectively visualize or even represent dynamics of space weather. Current understanding is primarily limited to insitu measurements of species, tabular specifications of energy doses and capture of solar events. The current visualization of space weather and its dynamics revolve around mathematical modeling and simulation of various parts of the space weather system. The result is a very coarse, limiting and, at times, inaccurate representation of what actually happens. For example, in a Google Earth's depiction of space weather, the Earth's atmosphere is represented as an even spherical cover having color coding depicting energy levels or electron density. The specific ionic species, densities and interactions are not shown, and the resolution of distinguishing patterns are extremely large and cover entire continents at a time.

What is needed is a method and system for gathering sufficient data that is accurate enough to describe and visualize space weather including the volume of species, their dynamics and their geospatial coverage around the globe. The present invention addresses this need.

SUMMARY OF THE INVENTION

To meet this and other needs, and in view of its purposes, the present invention provides a system for visualization of space weather. The system includes (1) a regime module for processing returned signals from at least one species in space and providing multiple output responses based on the returned signals, (2) a classification processor for providing identification of the at least one species in space, and associating the multiple output responses with the at least one species, and (3) a high definition (HD) processor for receiving the associated multiple output responses with the identified at least one species and providing visualization of the at least one species to a user.

The regime module may include a laser induced fluorescence detection and ranging (LIFDAR) system for transmitting multiple wavelength signals toward the at least one species and providing the multiple output responses. In addition, a calibration module, may be disposed between the regime module and the classification processor, for calibrating the multiple output responses and providing densities of the at least one species as a function of range to the species.

The classification processor may include multiple parameter modules, in which each parameter module determines one of either traces, abundance, or existence of the at least one species based on the output responses provided from the calibration module; and at least one weighting module for receiving output determinations from the parameter modules and providing a weighted probability of existence of the at least one species as a function of range. The classification processor may include a Boltzmann-Saha algorithm for providing the identification of the at least one species. The classification processor may provide a dataset of the at least one species as an output to the HD processor, including multiple tuples of {x, y, z, t, d}, where the tuple of {x, y, z} is three dimensional location of the at least one species, {t} is time and {d} is density.

An HD controller may be included for providing dynamic point control to the HD processor, and the HD processor may be configured to receive the multiple tuples from the classification processor and generate an image of the at least one species to the user. The dynamic point control to the HD processor may be controlled by the user.

The system may include another regime module for processing returned signals from another species in space and providing additional multiple output responses based on the returned signals. The other regime module includes one of either a LIFDAR system, a radar system or an imaging system.

The classification processor may include a fuzzy math algorithm, a singular value decomposition (SVD) algorithm, or a neural network algorithm.

The present invention, in another embodiment, includes a system for identifying at least one species in space. The system includes (1) a physical response module for outputting multiple spectral data based on received signals from a target in space, (2) a calibration module for receiving the spectral data and outputting a first dataset, including density of an {x, y, z} coordinate location in space as a function of time, t, and (3) a classification module for receiving the first dataset, and outputting a second dataset including multiple tuples of {x, y, z, t, d} associated with the at least one species, wherein d is density of the at least one species.

The physical response module includes one of either a LIFDAR system, a radar system, an imaging system, and an in-situ processing system.

The calibration module may include a LIDAR algorithm for determining the first dataset.

The classification system includes a Boltzmann-Saha algorithm, a fuzzy math algorithm, an SVD algorithm or a neural network algorithm.

The physical response module, the calibration module and the classification module are, respectively, a first physical response module, a first calibration module and a first classification module, and the system further includes: (4) a second physical response module including one of either another LIFDAR system, another radar system, another imaging system, or another in-situ processing system, and (5) a second classification module including one of either another Boltzmann-Saha algorithm, another fuzzy math algorithm, another SVD algorithm or a neural network algorithm. The second classification module outputs a second dataset including multiple tuples of {x, y, z, t, d} associated with a second species, and d is density of the second species. The first and second classification modules include statistical weighting parameters configured to operate on the first and second datasets and provide probabilities associated with the existence of the first and second species.

An HD processor for receiving the first and second datasets from the first and second classification modules is included for providing a visual image of the first and second datasets to a user.

The first and second classification modules may include a feature recognition algorithm for comparing the first dataset with a library of predetermined spectral intensities and estimating existence of the at least one species. The calibration modules may include a range correction module and an extinction correction module configured to operate on the spectral data and subsequently provide the first dataset as an output.

A summer may be included for receiving the second dataset and providing a total electron count (TEC) for the at least one species.

It is understood that the foregoing general description and the following detailed description are exemplary, but are not restrictive, of the invention.

BRIEF DESCRIPTION OF THE FIGURES

The invention may be understood from the following detailed description when read in connection with the accompanying figures.

DETAILED DESCRIPTION OF THE INVENTION

Figure 1:
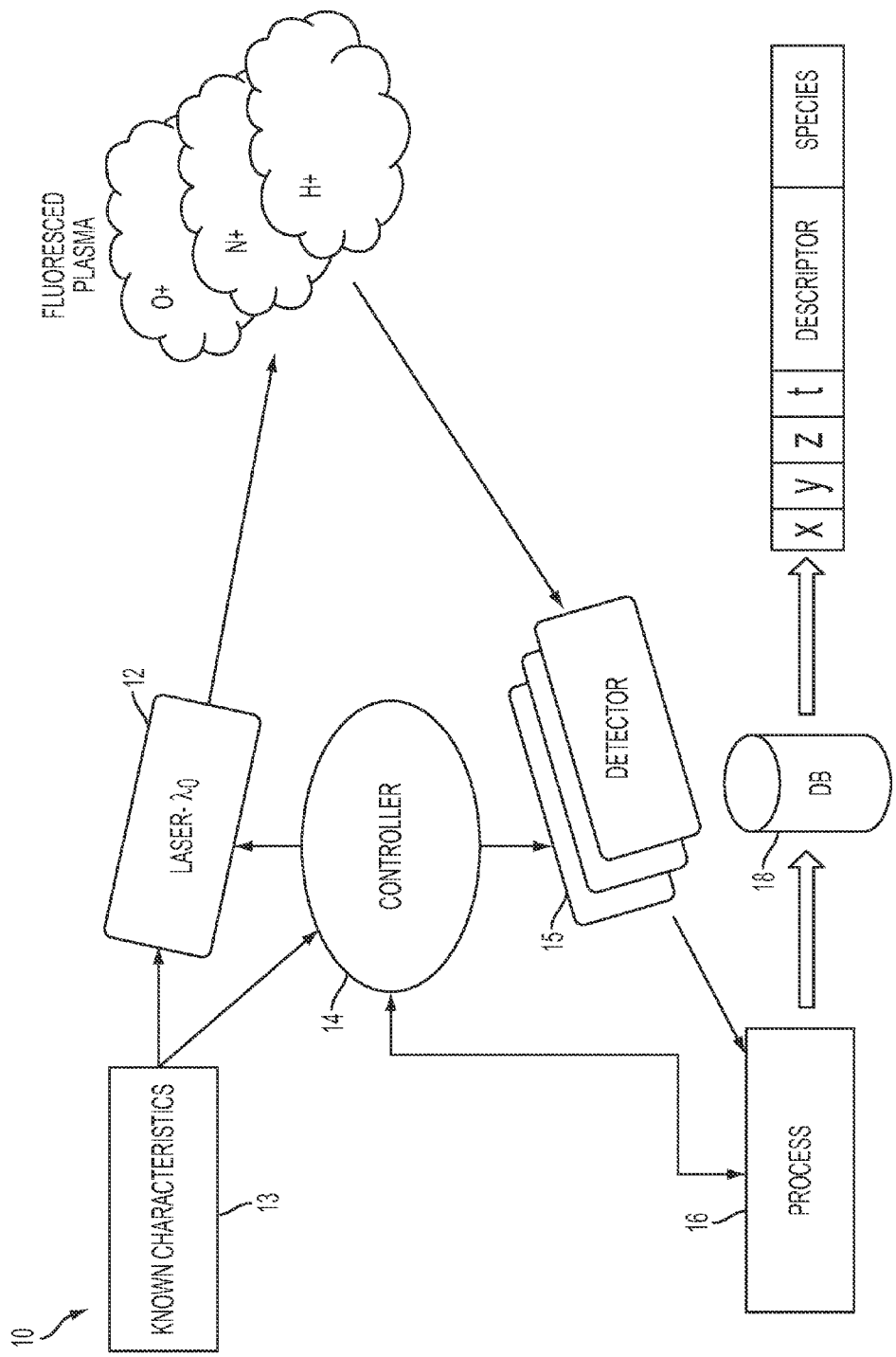
FIG. 1 is a laser induced fluorescence detection and ranging (LIFDAR) system for collecting data, including three dimensional orientations of various species in the magnetosphere including their temporal variations, in accordance with an embodiment of the present invention.

Referring first to FIG. 1, there is shown a laser induced fluorescence detection and ranging (LIFDAR) data collection system. As shown, system 10 includes tuned laser 12, controller 14, detector 15, processor 16 and database 18. The system 10 is described in detail below.

The tuned laser 12 is a coherent light source that is constructed by energy transition of electrons in atoms and molecules from a high energy state to a lower energy state (or difference of energy states), E1–E2. This transition produces a quantum of energy in the form of a photon at a specific wavelength given by:

$$E1 - E2 = \frac{hc}{\lambda_0} \quad (1)$$

where $\lambda_0$ is the output wavelength of the tuned laser, h is Plank's constant, and c is the speed of light.

Through constant stimulation of these atoms or molecules, the photons are produced at a constant rate to generate light at the most probable energy transitions. The laser 12 is tuned to desired wavelengths by stimulating the electron energy transitions to correspond with a desired wavelength, combined with prism multiplying techniques. The laser may be tuned to desired wavelengths by using a database of known characteristics, generally designated by 13, which provides the required transmitting wavelengths from the laser toward the gas or plasma, such as oxygen, nitrogen and hydrogen ions, to produce fluorescence at respective excitation energy levels.

It will be appreciated that laser induced fluorescence is an active spectroscopic method used for studying structures of molecules, detection of atomic and molecular species, and velocity measurements within a gas or plasma. The laser 12 may be tuned by controller 14 to a desired wavelength of the species' electron excitation energy level. After some time (a few nanoseconds to microseconds), the electrons of the excited atomic or molecular species de-excite and emit light at a wavelength larger than the excitation wavelength. The wavelength is dependent upon the energy level transition of the electrons and the probability that the electron will de-excite to that energy state. This light, or fluorescence, may then be measured by detector 15, or several detectors 15 for the multiple wavelengths transmitted by laser 12.

The detection and ranging of light emissions is based on time of flight measurements. This is commonly found in LIDAR systems where the processed data may be intensity as a function of range. The range may be calculated based on the time of flight of the photon from laser source 12 to the excited species and back to detector 15.

In the example shown in FIG. 1, for light induced fluorescence data, the laser 12 transmits pulses at a specific pulse rate and a specific phase. The corresponding fluorescence also has its own rate of intensity variations and likely a different phase. By measuring the intensity variation of the fluoresced gas or plasma, a curve depicting light intensity verses time may be generated. The light curve has its own associated phase, which is different from the phase of the original transmitted laser pulse. This phase difference provides a time difference, which corresponds to the time of flight. This time of flight provides the range to the fluoresced gas or plasma.

In the embodiment shown in FIG. 1, processor 16 receives the detected data from each fluoresced plasma and computes the range to each species. A look up table (LUT) may also be generated and stored in database 18, which includes range to each identified species, which may be identified based on the transmitted laser wavelength and the fluoresced wavelength from the species. The processor may also generate and store an LUT that includes geo-referenced range to the identified species. Accordingly, three dimensional (3D) data in an x, y, z coordinate system may be generated for each species, where x and y are horizontal coordinates with respect to the Earth and z is altitude with respect to the Earth. Similar received data processed over a period of time allows for four dimensional (4D) data in an x, y, z, and t coordinate system per species, as shown in FIG. 1.

Figure 2:
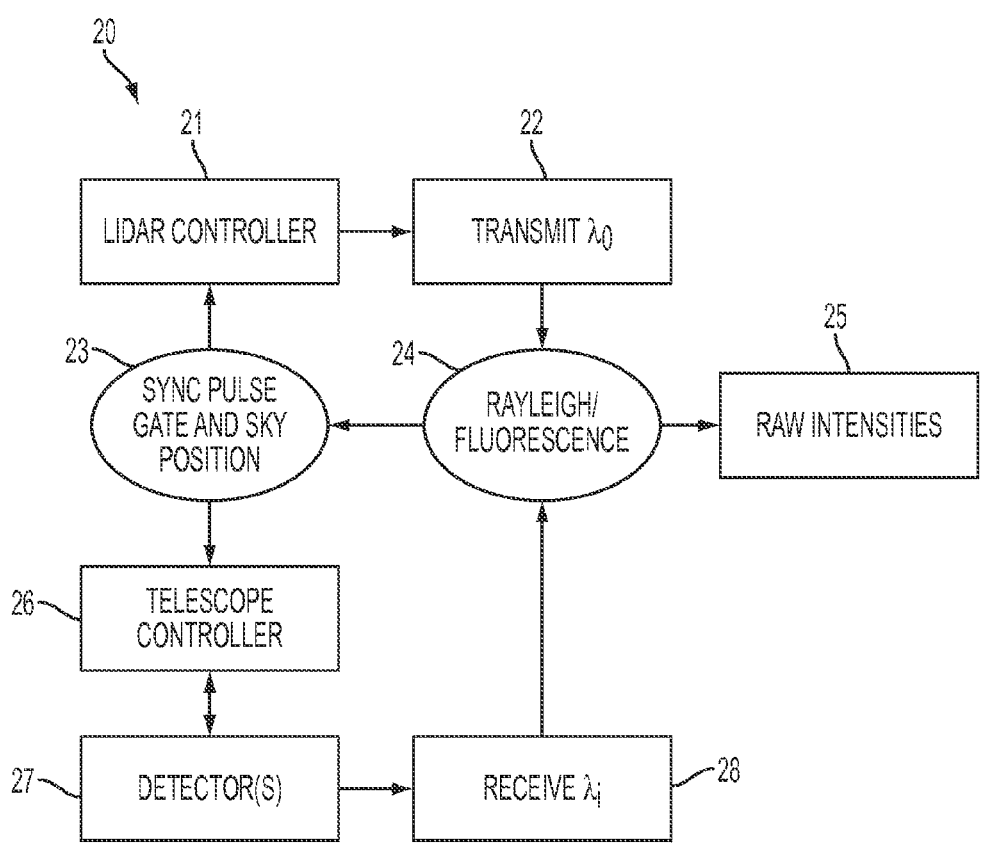
FIG. 2 is a block diagram depicting a process for collecting raw intensity data of various species in the magnetosphere, in accordance with an embodiment of the present invention.

Referring next to FIG. 2, there is shown another system, designated as 20, for producing raw intensities, or raw data from species in the magnetosphere. A LIDAR system including controller 21 generates a pulsed signal directed to a species. The pulsed signal is synchronized, by way of synchronizer module 23, to the sky position of a telescope including telescope controller 26. The LIDAR transmits the pulsed signal at a first wavelength of $\lambda_0$ toward the species by transmitter 22. The LIDAR system then receives a fluoresced signal from the species at a wavelength of $\lambda_i$ by receiver 28. The received signal is detected by a one or more detectors 27. The detected data includes raw fluorescence intensities and raw Rayleigh intensities, finally outputted by module 24.

The fluoresced energies are directly related to the number of electrons transitioning from the excited state to the lower recorded state at the wavelength within the plasma cloud. Using at least two detected intensities at different wavelengths that are longer than the original transmitted wavelength, $\lambda_0$, the Boltzmann Equation may be solved to obtain the number of atoms or molecules that are singly ionized, assuming local thermodynamic equilibrium.

Figure 3:
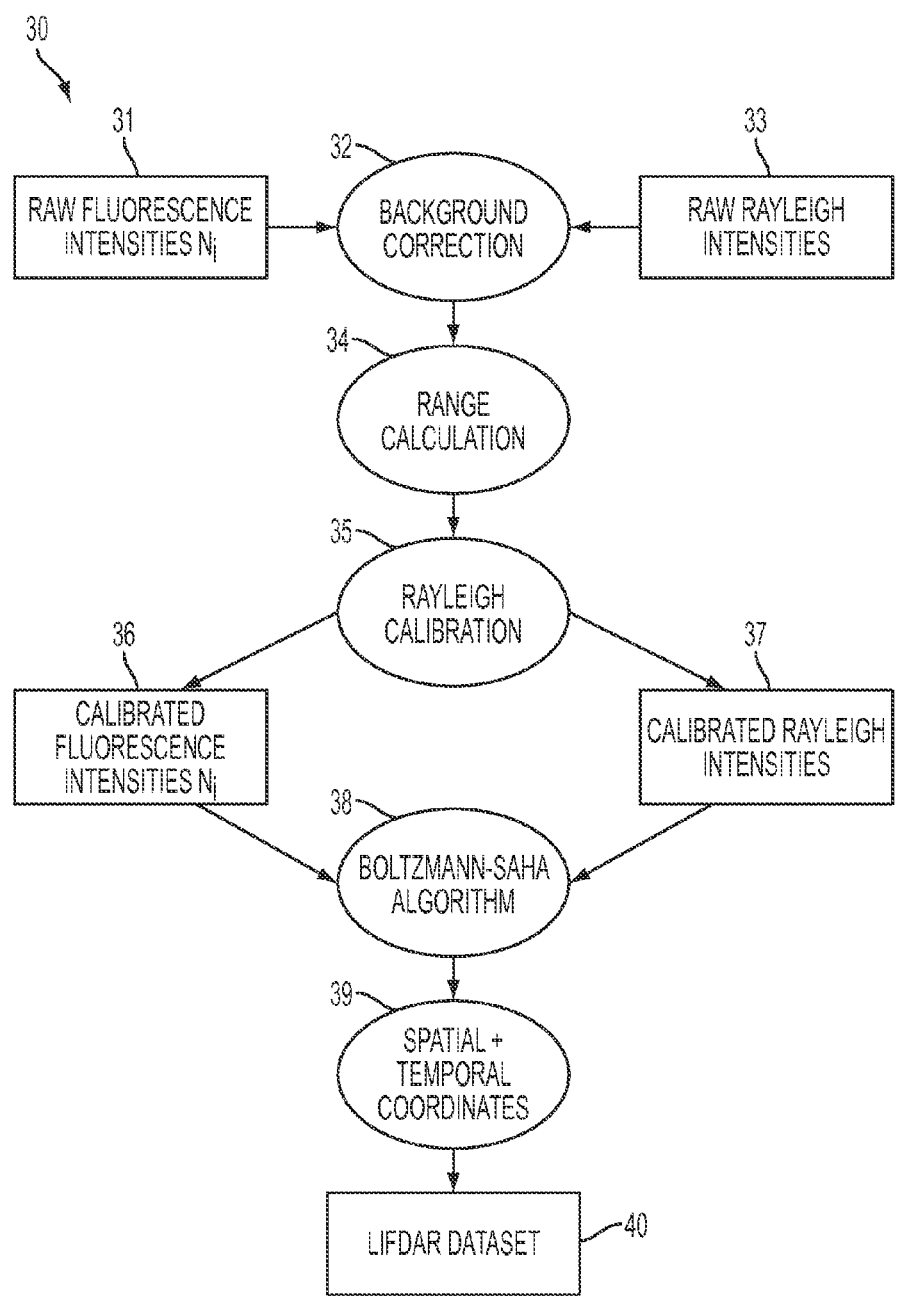
FIG. 3 is a block diagram of a method for collecting, processing and calibrating data to form a dataset for use in visualizing the magnetosphere and for space weather predictions.

An example of calibrating luminosity of the fluorescence to determine chemical abundance for atomic and molecular species is provided in FIG. 3. As shown, the raw fluorescence intensities, received by module 31, and the raw Rayleigh intensities, received by module 33, are corrected for background noise by module 32. Based on range calculation, by module 34, and Rayleigh calibration, by module 35, calibrated values for the fluorescence intensities (module 36) and Rayleigh intensities (module 37) are obtained.

Using the LIDAR equation for resonance fluorescence and the range calculations, the number of ions in a specific energy state may be calculated. The LIDAR equation for fluorescence is as follows:

$$N_I(z) \sim N_R(z_R) \frac{F_S(\lambda i, z) - F_B \delta t}{FR(\lambda i, z_R) - F_B \delta T} \frac{z^2}{z_R^2} X_{\textit{eff}} \quad (2)$$

where $N_i$ is the density of an ion species as a function of range, z, $N_R$ is density of atoms or molecules from Rayleigh scattering, $F_S$ is the fluorescence signal, $F_R$ is the Rayleigh scattering signal, $F_B$ is the background noise, z is the range of the fluoresced ions, $z_R$ is the range to the Rayleigh scattered atoms or molecules, $\lambda_i$ is the fluorescence wavelength, and $X_{\textit{eff}}$ is the effective extinction of the atmosphere at $\lambda_0$.

The Rayleigh scattering is included in Equation 2 to effectively calibrate the intensity of the fluorescence signal, so that the absolute illuminating energy may be calculated to give $N_j$.

By using Equation 2 for both the ion and neutral atom or molecule species, the free electron density (Ne) may also be calculated via the Boltzmann-Saha algorithm, as shown by module 38. It will be understood that the Boltzmann-Saha algorithm is a mathematical solution to an estimation problem. Specifically, the Boltzmann-Saha algorithm is geared towards estimation of a single species, whereby a limited scanning regime discriminates against one species. There also exits a class of algorithms using mathematical optimization techniques that may be used to estimate parameters for multiple species detected by diverse operating regimes.

Given that the absolute electron density is produced by all ion species in the atmosphere at altitude z, the free electron density measured by fluorescing the most abundant molecular species is a statistical lower limit at that altitude. This is useful in that lower limits to the electron density at any given altitude is measured. In contrast, radio frequency (RF) techniques, in use today, are unable to distinguish between species and only obtain the largest signal return, representing one altitude.

By tuning the laser to known spectral indices of the atomic or molecular species (which may be taken from database 13), the gas is fluoresced and the emission of the fluorescence may be captured by a detector. Based on several returns, a phase difference between the laser pulse and the light curve of the fluorescence may be established. This phase difference provides the time of flight, from which the range to the fluoresced gas or plasma may be determined. Gathering this type of data as a function of time provides the end user with species abundance, range, and its dynamics (position and velocity as a function of time) at various spatial coordinates (module 39). The final LIFDAR dataset may be stored in module 40 and may include geo-referenced x, y, z data for each species as a function of time and density of each species.

Multiple lasers may also be used for tuning to different spectral lines. Following detection of multiple received fluorescence flux, various calibration processes and different estimation processes may follow; the Boltzmann-Saha algorithm is only one example of such an estimation process.

Based on scanning rate, capacity and geo-location, there may be locations on the Earth that require approximations. The present invention contemplates extrapolating the dynamics and temporal relationships of the sampled data to areas that are not fully covered. For example, Earth bound scanners may have large areas that are not covered over large water masses. However, by knowing how species interact and the temporal aspects of the system, the present invention may extrapolate the conditions over these areas with higher accuracy than what is currently available.

In addition, an aspect of space weather that is prevalent today is the mathematical modeling of the interaction between matter and electromagnetic fields. All of these models, however, rely on solar observations and do not have access to immediate and local data. The level of processing contemplated by the present invention is an increase in the available data, based on newly acquired local data. This makes a profound effect on the space weather modeling efforts. In essence, a form of finite element analysis becomes possible. This is because a higher level of system perturbation parameters are made available on a smaller scale which, in turn, allow small elements to be modeled with a small set of dynamics. This is in contrast with a large system dynamics which controls the science today. The range of processing that is contemplated by the present invention greatly increases the available data of today.

Species discrimination may also open up a range of processing geared towards weather forecasting. With a higher level of detail into the dynamics of the magnetosphere, coupled with the existing knowledge of dynamics and temporal information, the present invention provides a higher level of space weather forecasting capability.

Due to limitations in available data, such as stratification of ionized species and their dynamics, very little has been done to effectively visualize or even represent dynamics of a system for space weather. Current understanding is primarily limited to in situ measurements of species, tabular specification of energy dose and capturing of solar events. The current visualization of the system and its dynamics revolve around mathematical modeling and simulation of various parts of the system based on these limited data sources. The result is a very coarse, limiting and, at times, inaccurate representation of what actually happens.

Figure 4A:
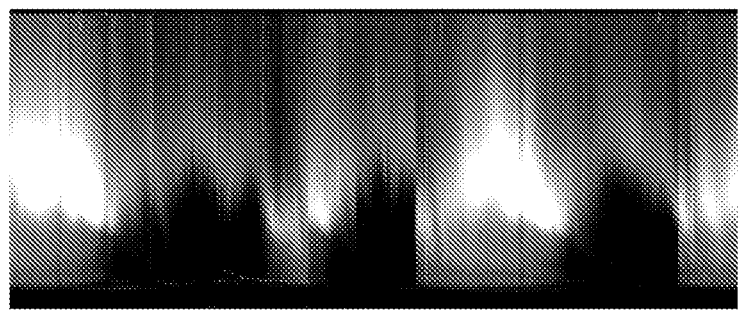
FIG. 4a is a layer stratification of intensity levels of ionic species in the ionosphere.
Figure 4B:
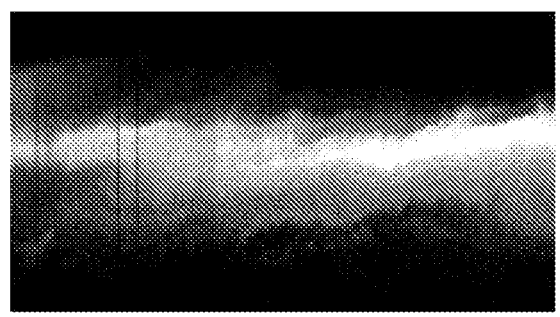
FIG. 4b is a depiction of potassium concentration in the upper atmosphere.

The present invention contemplates stratification of the ionized species and their dynamics as a function of time. For example, FIG. 4a depicts a vertical pattern that is similar to the Northern lights, which are highly dependent on space weather activity and are characterized in stratified layers. The figure shows varying amount of densities as a function of altitude, when visualizing the ionic species content of the ionosphere. FIG. 4b shows stratification of potassium concentration in the upper atmosphere of the Earth in vertical slices. Thus, the stratification of species in the ionosphere (for example) by the present invention provides a much more elaborate and detailed depiction of space weather than is presently provided by the simplistic depiction of space weather presented by Google Earth and similar offerings.

Similarly, when visualizing species content, a three dimensional gas plume similar to that available from various fluid mechanisms may be obtained by the present invention. Such a three dimensional depiction of species content is missing from current capabilities. Detailed visualization of species in the ionosphere, however, is now possible by obtaining a resolved data set, in both time and space, with different devices, such as a LIFDAR scanner. A highly resolved data set, in time and space, allows a realistic visualization of the ionosphere not possible before.

Parallelism may be made between visualization of tornados before and after discovery of tornado dynamics. Before such discovery, a tornado's internal workings were not known and the complex air and water convection were also not known and, thus, could not be visualized. Driven by the need to realistically predict the formation and life of a tornado, various visualizations were considered and used to come up with a set of solutions. Some of these solutions are currently relied on to predict weather in the atmosphere. The same is true for space weather predictions.

Figure 5:
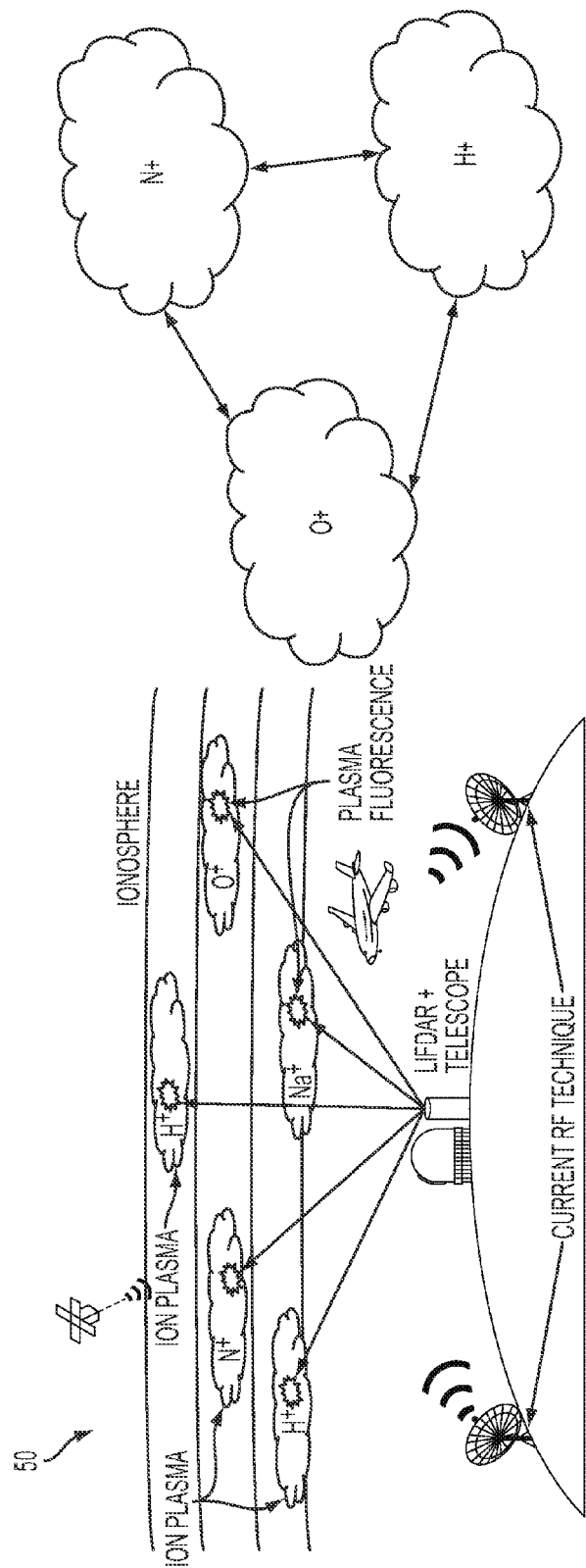
FIG. 5 is a functional diagram of multiple systems used for collecting data of various species located in different layers of the ionosphere, in accordance with an embodiment of the present invention.

The current state of visualization is limited to the available set of data, which is mostly dependent on mathematical models. By providing a stratified (layered) data source, however, a three dimensional aspect of space weather may be realized. Furthermore, species discrimination in a stratified manner allows a higher level of diagnostic access to data that has not been done before. Even for Earth weather, the amount of species discrimination is limited to vapor content. The present invention, however, allows discrimination between many species, such as nitrogen, oxygen and hydrogen, thereby providing capabilities of visualization orders of magnitude better than what is currently available. Other aspects of sensing, such as temperature, velocity, ionization, and temporal relationships may also be captured and then visualized. A system, designated as 50, for capturing data from the ionosphere, as an example, to provide visualization of space weather is shown in FIG. 5. As shown, system 50 includes at least one LIFDAR system coupled with a telescope (shown in more detail in FIGS. 1 and 2), which are used to stratify various species in the ionosphere as a function of x, y, z coordinates and as a function of their respective temporal changes (time as a variable).

In addition, system 10 also includes at least two RF transmitters, located a large distance from each other, to determine the geo-locations of other species and particles not detectable using laser wavelengths. Details of using RF transmitters for space situational awareness and space weather is disclosed in a related patent application Ser. No. 12/688,299, filed on Jan. 15, 2010, by some of the inventors of the present invention. That Patent Application is incorporated herein by reference in its entirety and is applicable, by extension, to land based antenna and transmitter systems.

Figure 6:
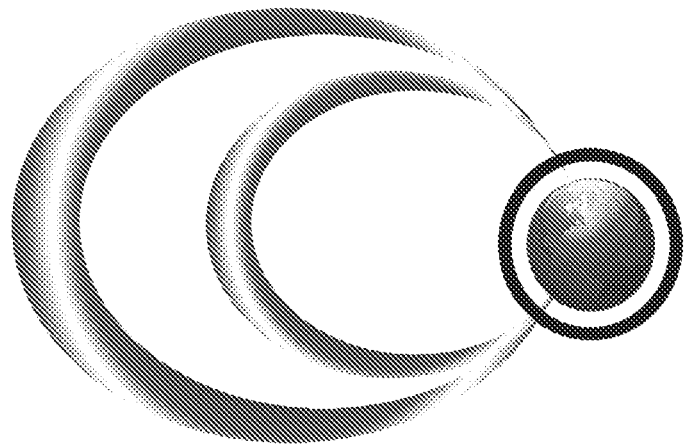
FIG. 6 is a visualization of the Van Allen belts and the ionosphere surrounding the Earth.

In addition to mapping species in the ionosphere as a function of time, the present invention contemplates mapping the entire magnetosphere. For example, there is a relationship between the outer Van Allen belt, inner Van Allen belt and the ionosphere which has been studied and modeled. Missing, however, is an infusion of remotely sensed data with a higher level of detail to describe this relationship. For example, diffusion between the Van Allen belts are described as a uniform diffusion. Current understanding of how much and when this diffusion occurs is missing. The geographical distributions and visualizations that relate the diffusion to other aspects of space weather, such as the remote sensed data of the present invention and existing remote sensed data from solar observers. A general relationship between the Van Allen belts and the ionosphere is shown in FIG. 6.

Figure 7:
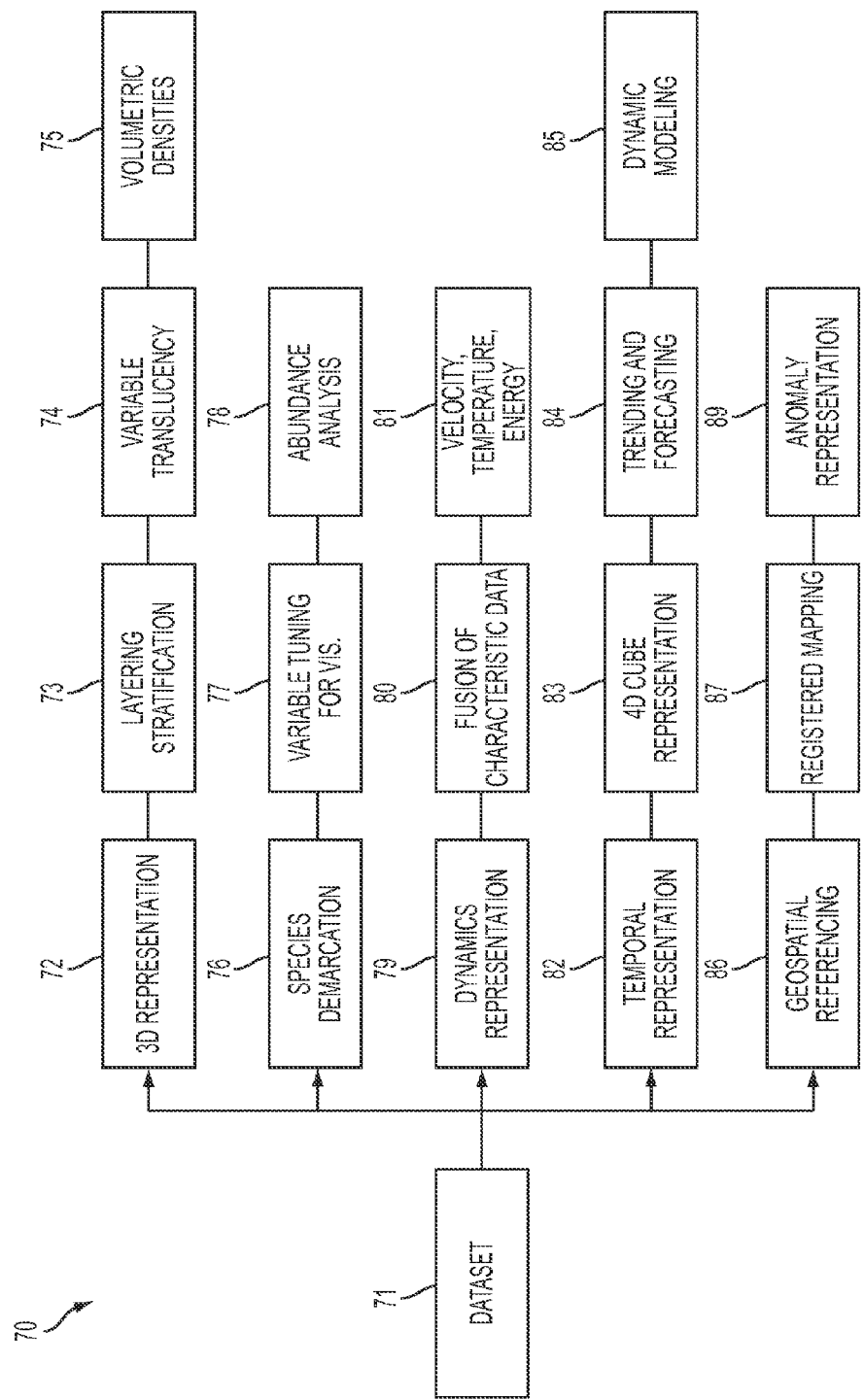
FIG. 7 is a block diagram showing a visualization process for space weather, in accordance with an embodiment of the present invention.

A visualization method of the present invention, generally designated as 70, is depicted in FIG. 7. The method is formed from data contained in dataset 71 which may be obtained, for example, from the systems shown in FIGS. 1, 2 and 3. The method 70 provides species discrimination (aka material composition) in a stratified manner (stratified, for example, in altitude), with geospatial coverage (corresponding to the ground) and dynamic characteristics (aka diffusion layers and hot spots) in a temporal sequence (as a function of time). This is motivated with parallelism to tornado visualization and will benefit airplane route planning, satellite trajectory planning, GPS signal perturbations (signal delay and loss), satellite communication loss estimation, satellite longevity determination, etc.

The visualization method shown in FIG. 7 is described below, although it will be understood that other aspects of visualization data may be contemplated and a higher level of visualization may be derived than that shown in FIG. 7. The set of derived steps are similar to concepts used today in earth weather to delineate cold/warm fronts, low/high pressure centers, eye of a hurricane, and the like. At present, dataset 71 is not available, but the present invention contemplates generating the dataset using the systems shown in FIGS. 1, 2 and 3 and then analyzing the available data, including data from dataset 71 and other known available data from conventional methods of weather modeling.

Step 72—Forming 3D Representations of Species

A diagnostic volumetric dataset is preferred over a volumetric surface dataset because it provides information that otherwise may be hidden. In a diagnostic volumetric dataset, the volume is described by a tuple (x, y, z) which occupies the space for each (x, y, z) sample point; a volumetric surface dataset, however, only describes a portion of the tuple (x, y, z) that corresponds to a particular surface, which in space weather represents a detectable discontinuity. Systems, such as Geiger mode LIDAR systems generate only volumetric surface datasets, whereas linear mode LIDAR systems generate diagnostic volumetric datasets. While both datasets may be used for space weather, the present invention prefers a diagnostic volumetric dataset approach.

Visualizing diagnostic volumetric datasets requires segmenting regions having similar characteristics. This may be done by either using density maps or detection regimes to mark boundaries of changes in characteristics. One method of doing this is known as region growing. This method first seeds a starting point in a volume, then grows that point by considering neighboring points exhibiting similar characteristics. The method continues for each newly added point and ends at a point where there exists no more similar points, thereby forming a boundary. Region growing thus creates a metric that marks characteristic boundaries. The resultant species in the ionosphere, for example, now includes a finite boundary that may be used to form a surface and build up to a bounded volume with multiple finite surfaces.

The present invention also cuts through this volume, in order to visualize a layer stratification in a format of the registered data from the dataset (step 73). For example, if the original data includes densities, a virtual cut may visualize changes in densities across each cut. As another example, if the original data includes drift velocity, then an absolute velocity may be visualized in the species grown by the density data. A virtual cut is a basic visualization inside a volumetric space. More complex slicing may be introduced into a volumetric space, such as slicing formed by a fly-through. A fly-through provides a visualization of a volumetric space, as a user flies through the space.

Another element in visualizing a diagnostic volumetric space is in visualization of multiple segmented objects. This is important in situations when one object (species, for example) is completely engulfed by another object and thus may be completely hidden by that object. In order to prevent one object from hiding another object, the present invention includes forming a variable translucency in visualization (step 74). This may be done by assigning a higher level of translucency to the object that surrounds an inner object, so that the inner object becomes visible. The inner object, however, is assigned a smaller level of translucency. One thus may distinguish between two or more objects that are covered by overlap.

The method may also include visualizing an object (or species) by using a color scheme with varying levels of translucency so that the inner objects may easily be seen through the translucency of the outer object. Such visualization, however, does not provide a real texture feel to the surface of the object. Since the dataset may include different data pertaining to volume, the present invention also provides information to synthesize a virtual texture of an object (step 75). This is important when multiple datasets are fused together, such as densities and drift velocities, or density patterns in a density mapped volume. The synthesized texture may be implemented with variations in the surface or with a different color assignment to a specific density. One thus may distinguish between two or more objects at different states having complex dynamics that are covered by the overlap.

Step 76—Forming Species Demarcations

Given a dataset that uniquely classifies different parameters and characteristics of species, the present invention separates one species from another by demarcation. As such, a workflow is set to vary these parameters and characteristics in a way that visualizes a physical phenomenon. For example, in the process of a body of a material diffusing into a different type of material, a diffusion layer exhibits lower densities as the individual species transform. Therefore, when two different materials of lower densities are in the same region of space, they most likely are undergoing a chemical process. By varying the threshold in densities that mark the extent of some species, the present invention equalizes the resultant volumes so that the two species may be visualized in relation to each other. If other data, such as drift velocity, is included the species may also be selectively tuned in its local environment (step 77). This provides better visualization with added benefits of dynamic modeling.

Since multiple scanning regimes provide insight into species that have many levels of excited states, abundance analysis (step 78) is performed by the present invention to arrive at a desired solution. This analysis takes into consideration multiple detections that contribute to a single outcome. Such fusion of data is unique to visualization since varying degrees of detections may yield an abundance analysis; many fusion algorithms utilize a strict mixing and registration methodology to derive at a unified result. This is useful in several aspects of planning and analysis, much like determination of the total electron count (TEC), which is used today in ionospheric studies.

Step 79—Forming Dynamic Representations

In forming an understanding of the dynamics of the magnetosphere, the present invention analyzes multiple characteristics of detected points in space. Given at least access to velocity, temperature and energy in the dataset, the present invention fuses relevant parameters to gain a better understanding of the magnetosphere. This is similar to a process in a human organ that consumes and produces species that have unique signatures. For example, overlaying Doppler information on an ultrasound scanned image shows whether the species are moving and the direction of movement. Nuclear imaging (for example, PET-CT scanners) has provided the same type of added functionality by supplementing organ functionality to high definition soft tissue, or hard tissue scanning. An analysis of how the species are created or depleted plays an important role in the dynamics of space weather predictions. The dynamics are visualized by fusing various characteristic data (step 80) and characterizing the velocity, temperature and energy level of each species (step 81).

Step 82—Forming Temporal Representations

A 4D cube representation is used in Earth weather predictions. It indicates the temporal aspects of volumetric data derived from the atmosphere. Space weather data obtained by the present invention mainly parallels Earth weather and forms a 4D cube representation of space weather (step 83). Much like the dynamics and internal visualizations of tornados on Earth, space weather visualization is derived from the dynamic modeling generated by the present invention. Analysis of trends based on ambient conditions produce space weather forecasting (step 84).

Hurricane forecasting includes an analysis of water temperature, atmospheric pressure, jet streams and other factors. Similarly, the present invention analyzes coronal mass ejections, saturation of the Van Allen belts and other factors to provide space weather forecasting. Furthermore, after a coronal mass ejection, where residues of the ejection interact with the Earth's magnetosphere, the present invention predicts the interaction with the ionosphere based on the time delays in the ejection.

Step 86—Forming Geospatial Referencing

Current visualization of space weather is heavily geared towards modeling and simulation. The data detected and processed by the systems depicted in FIGS. 1, 2 and 3 allow higher definition and detail and, thus, may be accurately registered to corresponding points on Earth. Registration to anomalies, poles, equators and other landmarks are used to effectively deliver a suitable product to the end user (step 87).

Since complete coverage is not available at all times, some processes and trends need to be employed to effectively model such regions in space. Given the rich dataset provided by the present invention, it is possible to obtain a high definition of the current space weather, coupled with a higher definition of ground registered points.

The anomalies associated with discontinuities in the magnetic fields and earth rotation is a continuous subject of interest. Currently, there exists little pathway in depicting the relationship between the detected space weather and these anomalies. The present invention, with its rich and accurate dataset, contemplates providing representations of these anomalies (step 89).

Figure 8:
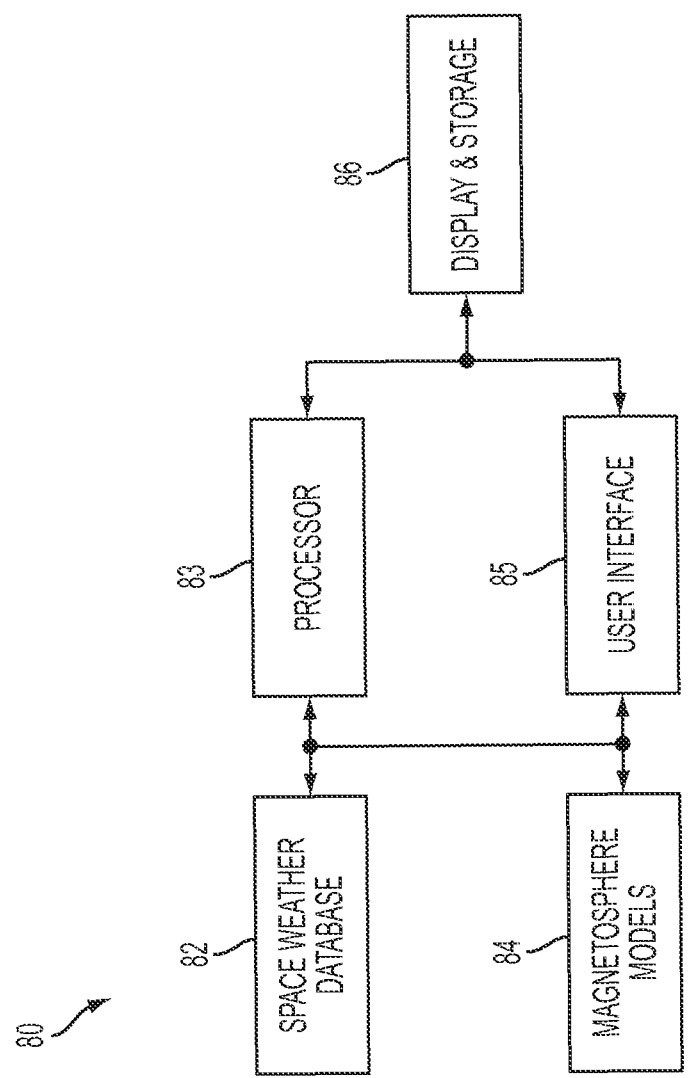
FIG. 8 is a block diagram of an interactive information visualization system, in accordance with an embodiment of the present invention.

Referring next to FIG. 8, an interactive information visualization system, generally designated as 80, includes two databases 82 and 84. The two databases are combined by processor 83 and interactively controlled by user interface 85. The output from processor 83 is provided to display or storage device 86 as desired by the user.

The database 82 includes data of multiple species located in the magnetosphere, and in particular the ionosphere. The data may include the geographic location of each identified species with respect to the Earth, and the density of each identified species. Thus, this database may include sets of tuples in (x, y, z) coordinates for each species collected during different periods of time. Computed differences in the tuples between one period of time and another period of time, executed by processor 83, provides temporal variations in each species and its relationships to one another. These temporal variations may also be stored in database 82. Other parameters, such as the visualization parameters shown in FIG. 7, may also be obtained by processor 83 or by an external processor (not shown). These data may also be stored in database 82. The tuple data for each identified species may be obtained by the LIFDAR system shown in FIG. 1, or by other systems, such as a SAR or a radar system (see FIG. 5), residing on the Earth or borne into space by a satellite.

Thus, accurate tuple data of each species is obtained and stored in database 82. These include real data of locations and densities of the species in localized regions, for example, a region in the ionosphere above a particular Earth location.

Coarse data obtained from existing mathematical models, such as data pertaining to electromagnetic field strengths between the Van Allen Belts and the Earth, may be stored in database 84. The coarse data may now be refined by combining the detailed real time data stored in database 82 with the mathematical modeled data stored in database 84. Processor 83 may perform the combining of both data from the two databases.

The present invention contemplates providing weather predictions of space to an end user that would be similar to weather predictions available today on the Earth.

Figure 9:
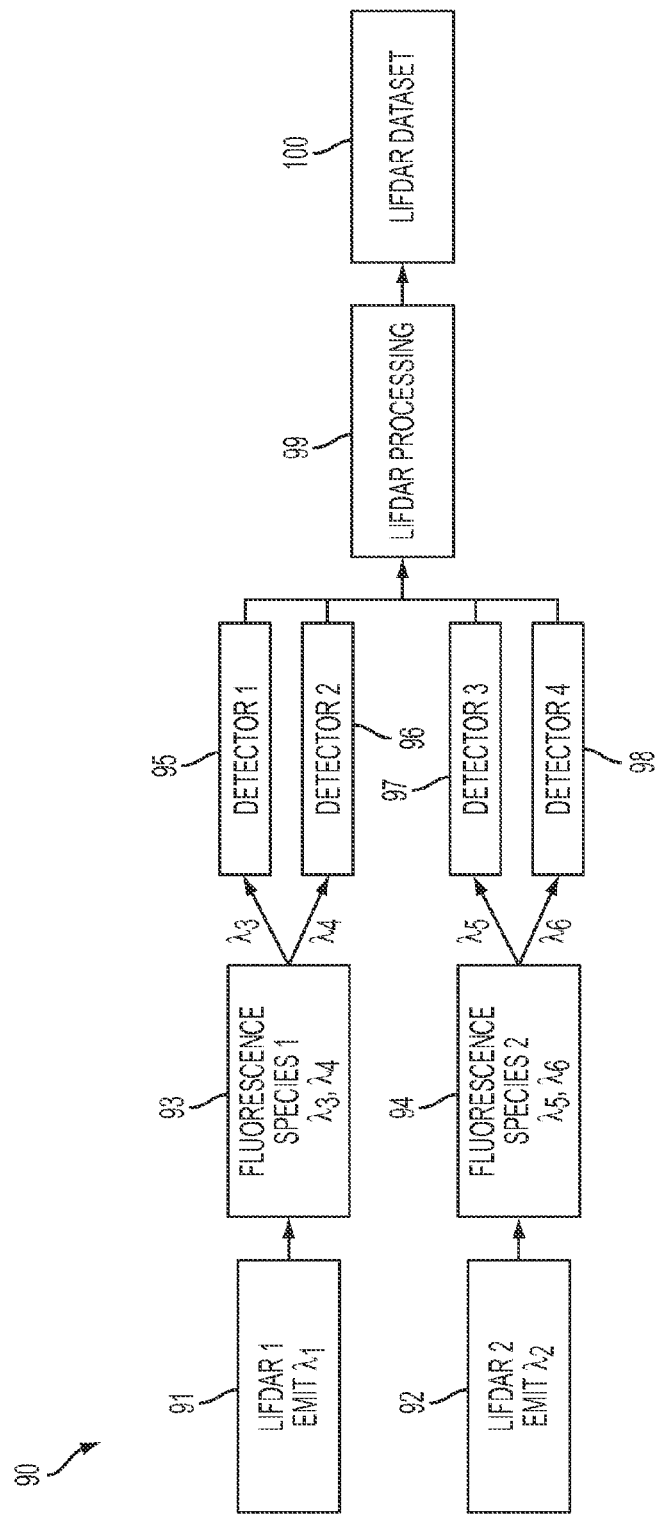
FIG. 9 is a block diagram of two, or more, LIFDAR systems, each used for collecting data of targeted species located in different layers of the magnetosphere, in accordance with an embodiment of the present invention.

Referring next to FIG. 9, there is shown system 90 which includes two LIFDAR systems, 91 and 92. Although only two LIFDAR systems are shown, it will be understood that more than two LIFDAR systems may be used. Furthermore, the LIFDAR systems may be co-located on the Earth or co-located in one satellite in orbit. Alternatively, one system may be located on the Earth and another system may be located in orbit around the Earth. Moreover, each system may include a scanning capability in order to provide azimuth and elevation data for each tuple (x, y, z) captured and stored in dataset memory 100. The scanning capability provides two-dimensional (2D) data with respect to a reference point, while the LIFDAR processor 99 calculates range data to each of the tuples, thereby making three-dimensional data (3D) available for storage. By using a coordinate transformation matrix, referenced to the Earth, processor 99 is able to obtain each tuple of a particular species in an (x, y, z) geo-referenced frame with respect to the Earth.

As shown in FIG. 9, each LIFDAR system transmits a unique wavelength (for example $\lambda_1$ and $\lambda_2$), while simultaneously scanning in azimuth and elevation. Radiation returned from each species fluoresces at a particular wavelength that is longer than the original wavelength of the transmitting laser. Using two different wavelengths that are longer than the original transmitted wavelength, the Boltzmann Equation, described earlier, may be solved to obtain the number of atoms or molecules that are singly ionized, thereby leading to density determination of each species as a function of range (see Equation 2).

The radiation returns from respective species, received by corresponding modules 93 and 94, are separately detected by respective detectors 95, 96, 97 and 98, each responsive to a different wavelength. The detected outputs from the multiple detectors are then calibrated and processed by LIFDAR processor 99 to obtain multiple tuples of (x, y, z) as a function of time (t). Density of each species as a function of range is also computed. Additional data, such as abundance of each species, and demarcation points of each species are also computed. Furthermore, processing the return radiation at different time intervals allows processor 99 to compute temporal variations in each species, including range and velocity vectors for each species, density variations of each species, and abundance variations of each species. The processed data is stored in memory 100, which includes multiple datasets, one dataset for each species.

Figure 10:
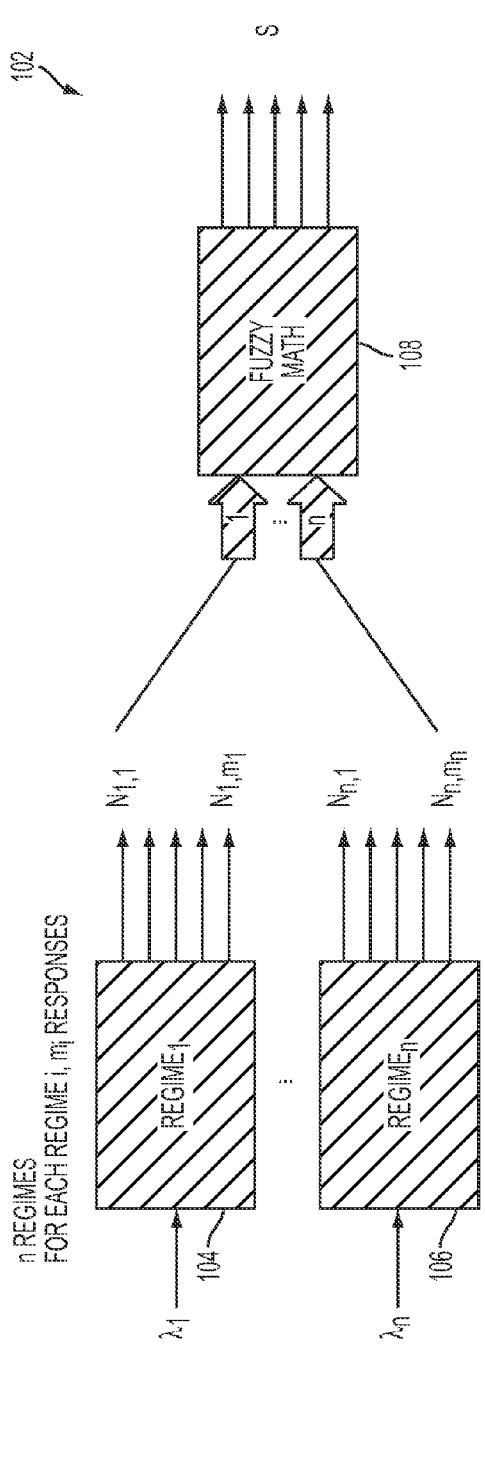
FIG. 10 is a block diagram of a species identification system including multiple regimes that are operated upon by a math processor, in accordance with an embodiment of the present invention.

Referring next to FIG. 10, there is shown a system, designated generally as 102, for processing multiple responses from "n" regimes using fuzzy math processor 108. Each regime, two of which are shown as regime 104 and regime 106, produces "m" different responses. The "n" regimes may include one or more LIFDAR systems, radar systems, and hyper-spectral imaging systems. The "n×m" different responses may be processed by fuzzy math processor 108 (as an example) for identifying multiple species, shown as the set "S". The set "S" may include multiple identified datasets, wherein each species (for example, oxygen, nitrogen, etc.) that is identified has its own dataset of multiple tuples (where, for example, each tuple is {x, y, z, t, d}).

It will be appreciated that a regime includes any system that provides active or passive sensing. For example, a regime may be a hyper spectral imager that scans the ionosphere or magnetosphere to detect similarly appearing points based on their spectral emissions. Another example of a regime is a platform that includes sensors, detectors, telescopes and/or cameras in orbit around the Earth. Multiple regimes, disposed on various platforms, may be positioned in a constellation configuration in orbit around the Earth to detect various species in space. Yet another example of a regime is an active system, such as the LIFDAR system described earlier. The LIFDAR system may tune the laser to known spectral indices of the atomic or molecular species, and fluoresce a gas in space. The emission from the fluorescence may be captured by a detector, or multiple detectors.

It is important to mention that a disadvantage of hyper spectral sensors is that the light source needed to provide emission or absorption is passive. If the species is known, and abundances are needed, active sensing systems provide the means through scattering or induced fluorescence (LIFDAR) at precisely the time a measurement is needed. Hyper spectral sensing does not probe the plasma, but rather, it watches the plasma for additional species when the light source is available. Both sensing techniques provide important information, but active imaging provides more practical information.

In the exemplary embodiment of FIG. 10, regime 1 (for example, a LIFDAR system) transmits a pulsed laser signal at wavelength $\lambda_1$. Returns from a gas, or multiple gasses are detected by regime 1 to provide multiple responses of $N_{1,1}$ to $N_{1,m1}$. Regime n provides responses $N_{n,1}$ to $N_{n,mn}$. In general, the "n" regimes, shown in FIG. 10, each outputting $m_i$ responses, provide a total of n×m responses.

Figure 11:
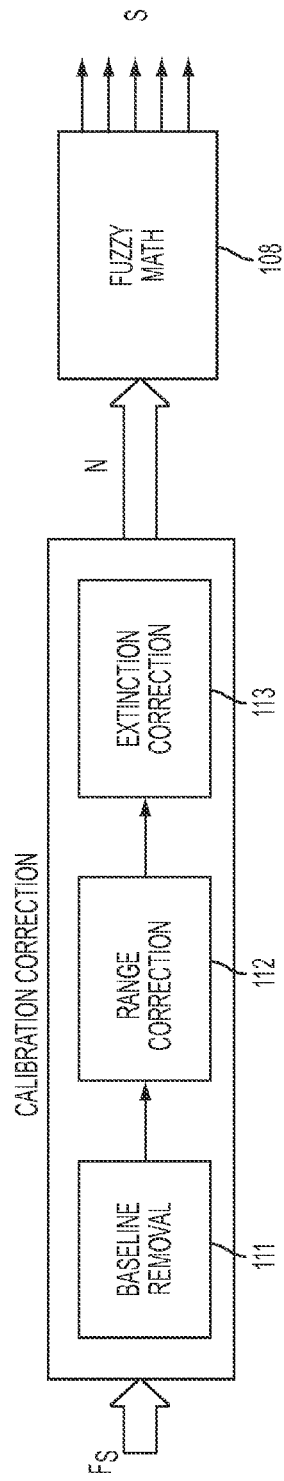
FIG. 11 is a block diagram of a calibration correction module that is interposed between the regimes and the math processor shown in FIG. 10, in accordance with an embodiment of the present invention.

Each response, $N_i$, is the density of an ion species as a function of range, as shown in Equation 2. Taking multiple samples of the species as a function of time provides temporal variations of the density of the ion species as a function of range (namely, the invention obtains a plurality of datasets of multiple tuples of {x, y, z, t, d}). It will be appreciated that in order to obtain $N_i$, each regime includes an exemplary calibration process, as shown in FIG. 3. Sample elements of the calibration process are shown in FIG. 11 and include baseline removal module 111, range correction module 112, and extraction correction module 113. In this manner, multiple volumetric datasets are generated as input datasets into fuzzy math processor 108.

Figure 12A:
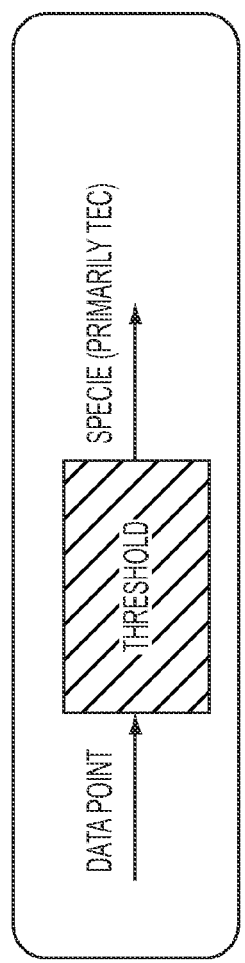
FIG. 12A is a block diagram of a single output of total electron count (TEC) of plasma in space, as computed by a conventional system.

It will be appreciated that in a traditional method of segmenting volumetric data, as provided by CT and MR scans, density thresholds are used. These are single point segmentations which primarily relate to consideration of a single parameter, such as threshold, from which density results in representation of a particular material or species. A single point segmentation process is shown in FIG. 12A. As shown, a single parameter threshold, is used to detect the total electron count (TEC). The TEC is the total number of electrons present along a path between two points, with units of electrons per square meter, where $10^{16}$ electrons/m$^2$=1 TEC unit (TECU).

Figure 12B:
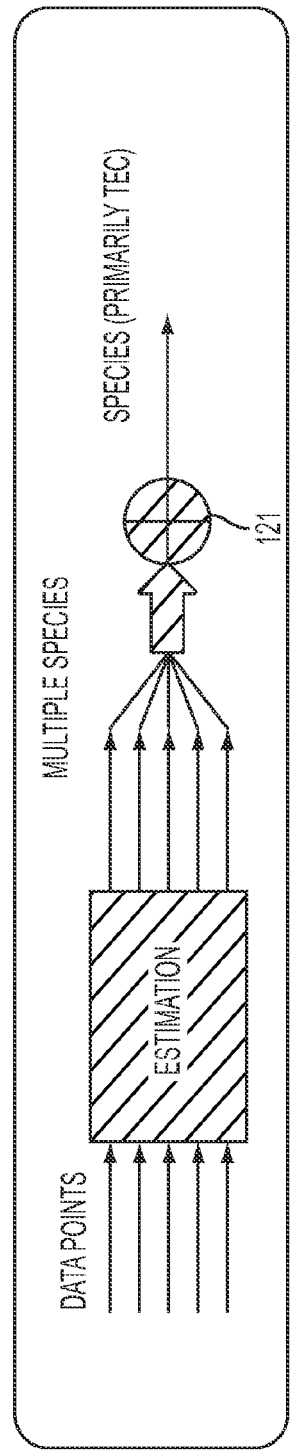
FIG. 12B is a block diagram of multiple species that are separated and identified by the present invention, and after being summed together provide the TEC output shown in FIG. 12A.

In the present invention, however, which may include one or multiple LIFDAR regimes, there exists multiple parameters used for the segmentation of species. As shown in FIG. 12B, multiple input data points ($N_{i,mi}$) are used as spectral returns from one or more energy injected sources (such as light sources) to estimate densities of multiple species. If the multiple outputs are summed together, by summer 121, the final output is related to the TEC measurements currently available.

Since the present invention identifies species based on multiple parameters, a fuzzy math processor may be used by the multiple species identification system 102, shown in FIG. 10. These multiple parameters may include thresholds used for multiple parameters, ratios of multiple parameters, abundance of one parameter (high threshold) and trace elements of another parameter (low threshold). The fuzzy math may also include a weighted arrangement for thresholds, including negative weights.

The ability to provide multiple parameters that are correlated based on the underlying species phenomenology allows a high level of mathematical exploitation by the present invention. While fuzzy math is one way, there are other venues to exploit such correlation to delineate species of interest, such as singular value decomposition (SVD) techniques and other optimal control concepts.

Figure 13:
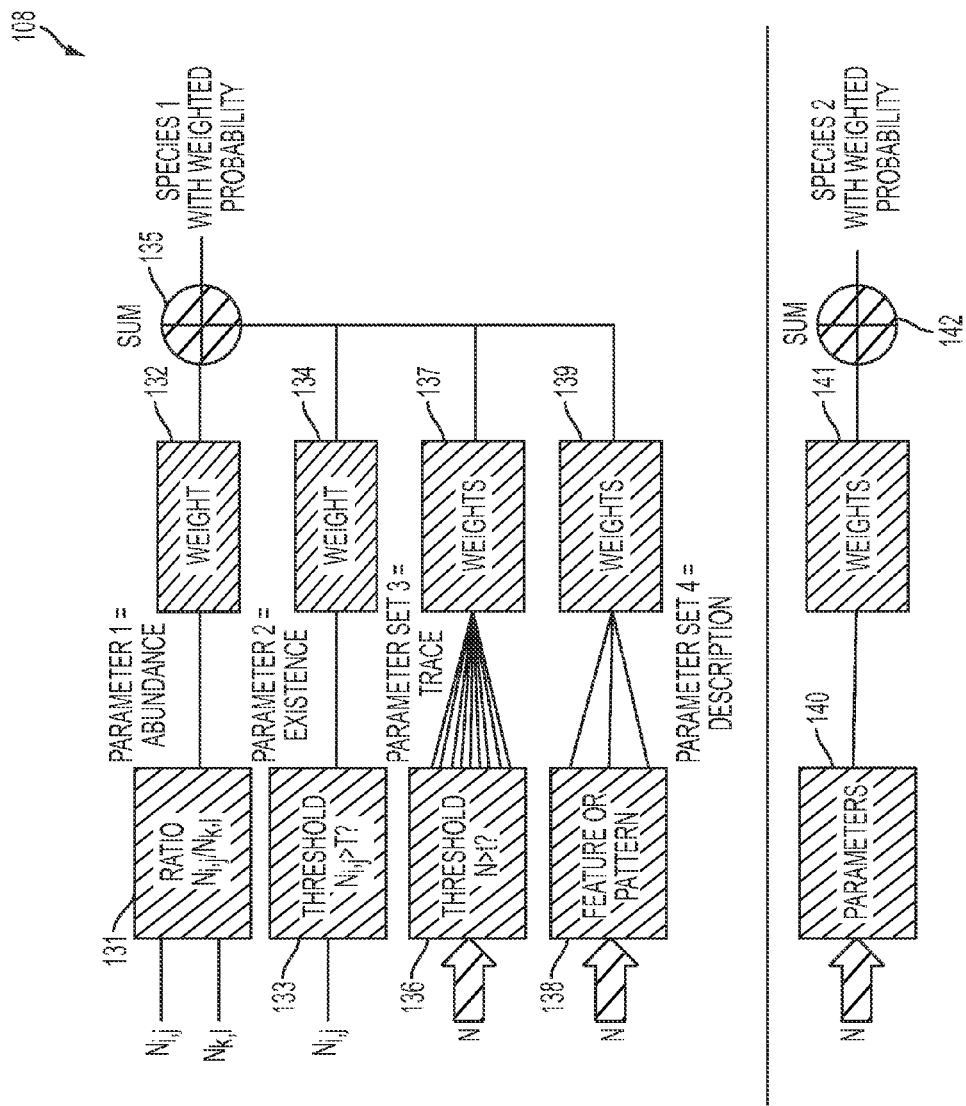
FIG. 13 is a block diagram of the math processor shown in FIG. 10, in accordance with an embodiment of the present invention.

Referring next to FIG. 13, there is shown an exemplary flow diagram of the processing executed by fuzzy math processor 108. As shown, four parameters are estimated by processor 108. The first parameter, abundance of one species relative to another species (for example, calculated from the Boltzmann-Saha algorithm), is estimated by ratio module 131, which divides one response by a second response ($N_{i,j}/N_{k,l}$). The second parameter, existence of a specific species, is estimated by threshold module 133, which determines whether a response, $N_{i,j}$, is larger than a predetermined threshold value of T. The third parameter, existence of a trace of another species, is estimated by threshold module 136, which determines whether various responses in the dataset of N are each larger than another predetermined threshold. The fourth parameter, description of a species or identification of a species, is estimated by feature/pattern recognition and estimation module 138, which matches various spectral responses in the dataset of N to predetermined spectral responses stored in the module (or another storage library). The outputs from the four parameter modules are, respectively, weighted by weighting modules 132, 134, 137 and 139. Next, the outputs from the four weighting modules are summed by summer 135 to provide an output of species 1 (oxygen, nitrogen, etc.) with a weighted probability.

In a similar manner, species 2 is determined to exist by using parameter modules 140, which may be the same or different from the series of parameter modules utilized to determine the existence of species 1. The outputs from the parameter modules are weighted by weighting modules 141 and summed by summer 142 to provide the degree of likelihood that species 2 exists.

Other parameters may be estimated by measuring the ratio between the received light to a functional relationship of the fluoresced species. One parameter that may be estimated by a functional relationship is abundance (e.g. density). This may be done by the present invention using the Boltzmann-Saha algorithm (FIG. 3). Other parameters may be estimated through other functional relationships to build confidence in the species identification and density estimation. The functional relationships may be inverted to arrive at the density of a species. This may be done in different ways, one of which is fuzzy math. Instead of applying a threshold or abundance estimation to yield a result of 0 or 1, the present invention may apply fuzzy logic to yield a fraction between 0 and 1. A result of 0.9 indicates that the estimator is 90% sure that the received light is from a particular species. These may be done across many regimes with many spectral lines to yield a high level of estimation certainty.

The present invention may also provide a mathematical basis to reduce the problem of processing a large number of data points to an estimate of a few important species. For example, Equation (3) provides a method of estimating the density of species based on probability distribution for the species ($p_{s_i}(N_{i,j})*(f_d(N_{i,j}))$) with respect to the regime output and a functional description of the density ($f_d(N_{i,j})$) with respect to the regime output. The $p_{s_i}(N_{i,j})$ term may be generated using singular value decomposition (SVD), statistical, functional, or even model based where an exact model is inverted.

$$Si = \sum_{i=1}^{n} \sum_{j=1}^{mn} p_{s_i}(N_{i,j}) * (f_d(N_{i,j})) \quad (3)$$

It is important to note that the regimes are specified with excitation of light to induce fluorescence and estimate densities. Other regimes may be devised to include radio frequency (RF) energies.

The present invention uses the following nomenclature to describe the states of space weather:

$\{x,y,z,t,d\}$ where
the $\{x, y, z,\}$ tuple indicates a location in space,
$\{t\}$ indicates time, and
$\{d\}$ indicates density of an identified species.

The invention removes the electron aspect of calculated TEC and actually identifies species density. In particular, the invention is interested in categorizing the ionization and specific energy states of oxygen, nitrogen and hydrogen (and its associated molecules). The range of specific species is much larger than a simple electron and its electron total count number.

Figure 14:
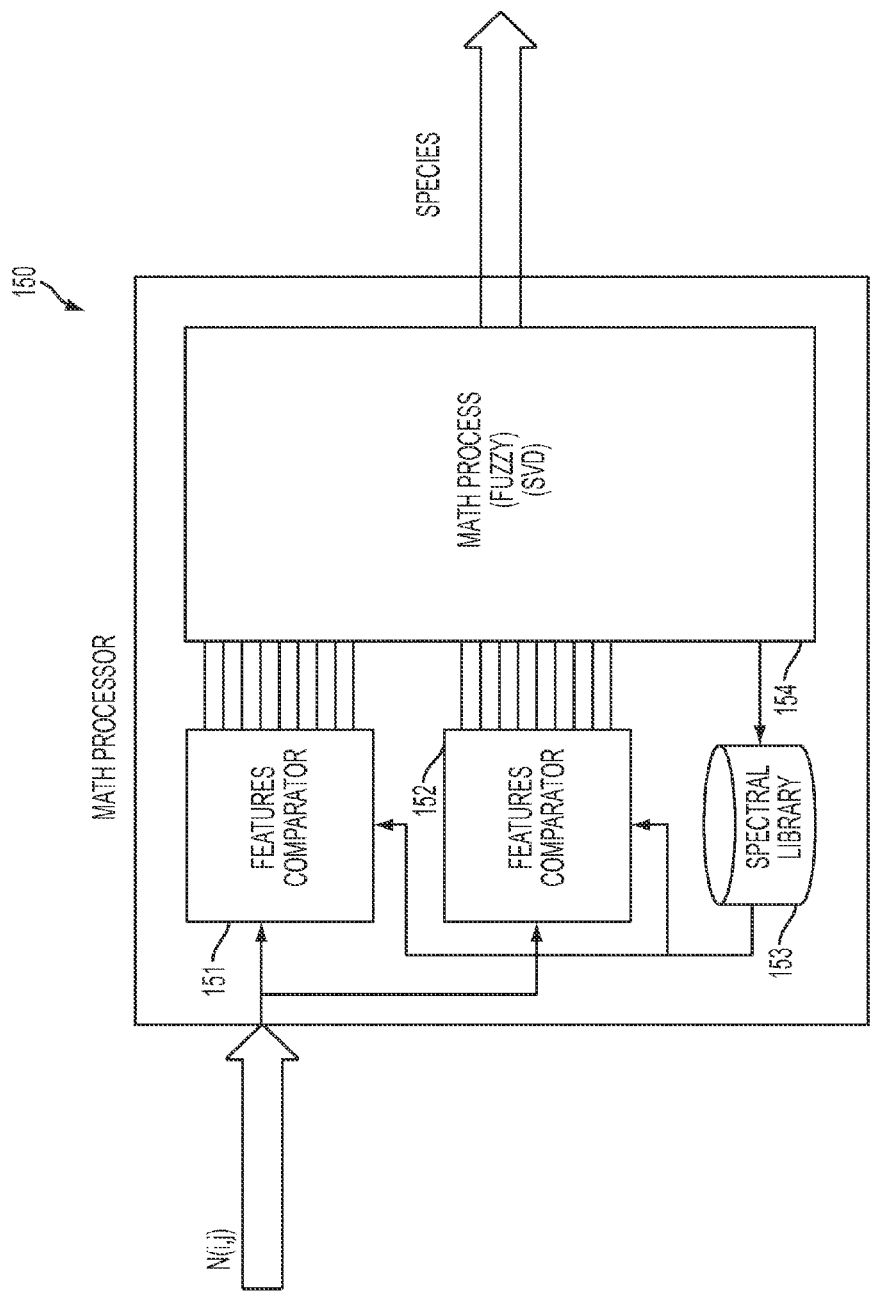
FIG. 14 is a block diagram of another math processor, in accordance with an embodiment of the present invention.

Referring to FIG. 14, there is shown another math processor, generally designated as 150. The math processor may execute fuzzy math or singular value decomposition (SVD) in block 154. Also included are multiple comparator modules 151 and 152, each comparator module determines whether the regime response includes unique signatures or features belonging to one species or multiple species. The unique signatures or features may be stored in a memory device, such as spectral library 153. Features such as line strength, line weakness (absence of flux at a particular spectral band), spectral spread and general spectral patterns as a function of wavelength, as related to the particular regime, may be used to estimate densities of one or more species. The overall estimation process may vary by regime and species requiring parametric analysis based on some predetermined spectral library. In addition, estimation techniques, such as fuzzy math, SVD, principal component analysis (PCA), neural networks (NN) and other algorithms may be used to estimate densities and the state of each species.

Figure 15:
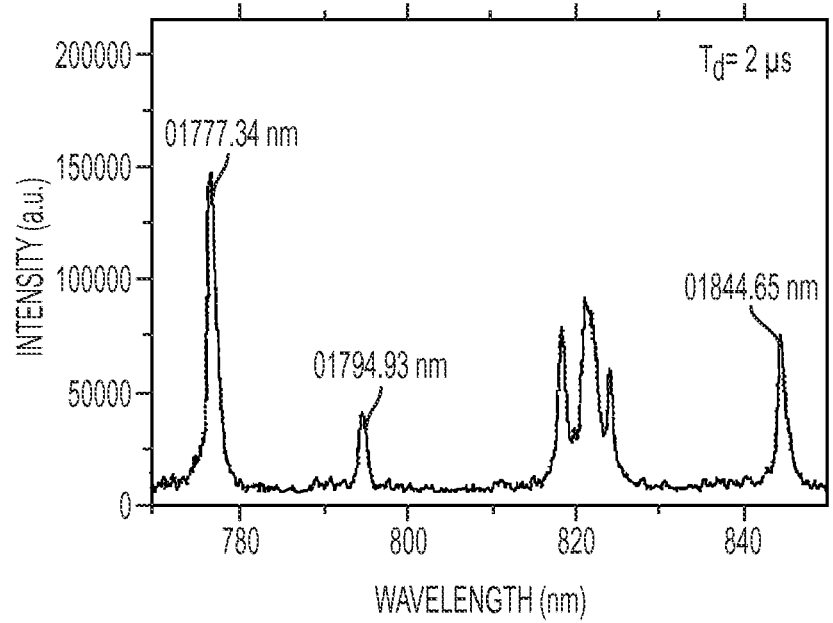
FIG. 15 is a plot of spectral features identifying atomic oxygen.

An exemplary signature is shown in FIG. 15, which depicts a sample spectral response of neutral oxygen. Molecular oxygen is identified by spectral responses, obtained by a LIFDAR system (for example), having six spectral lines at unique wavelengths. Each of the spectral lines has a unique intensity level and wavelength location, as in accordance with allowed energy levels of a particular valence electron.

Accordingly, the present invention may store the unique signature of molecular oxygen in spectral library 153. Comparator module 151 (for example) may include several threshold comparators, each estimating intensity levels of a sampled spectral response, as provided by the set of regime responses. Comparator module 152 (for example) may include several threshold comparators, in which each estimates intensity levels of another species, such as molecular nitrogen. The signature or features identifying molecular nitrogen may also be stored in spectral library 153.

The relationship between the spectral libraries, the comparator modules and the overall math processor is diverse.

Furthermore, regimes other than light induced fluorescence may be exploited to further aide in the identification of multiple species. Existence of strong responses, non-existence of other responses and smearing of grouped responses provides motivation for some of the mathematical processes described earlier.

Other blocks in FIGS. 13 and 14 may be added to provide additional features to enhance the process of identification of species, where each is identified with a dataset of multiple tuples of {x, y, z, t, d} belonging to known species (oxygen, nitrogen, etc.). After the calibration process, the invention may use ratios of responses to form a particular feature or use summers to sum up several responses based on information available in the spectral library to generate other features. Existence of a feature and non existence of another feature may form a powerful discriminator. The feature comparators may include features based on measured responses and known spectral information.

The calculation of particular species may also be used to augment the spectral library for use in future discrimination. Individual spectral responses with their own characteristics may be exploited separately by generating appropriate feature sets specific to certain species. Different portions of the spectral library may be utilized to inject appropriate factors for consideration in discriminating complex and large sets of species.

Instead of adding multiple feature comparators, as shown in FIG. 14, the present invention may include individual processing boxes, such as the ones shown in FIG. 13, and may add multiple boxes to encapsulate multiple regimes. This lends itself well when dealing with database entries that do not compare well with each other. Adding regimes such as radio frequency transceivers, imagers (such as GOES) and modeled parameters accomplishes this.

Figure 16:
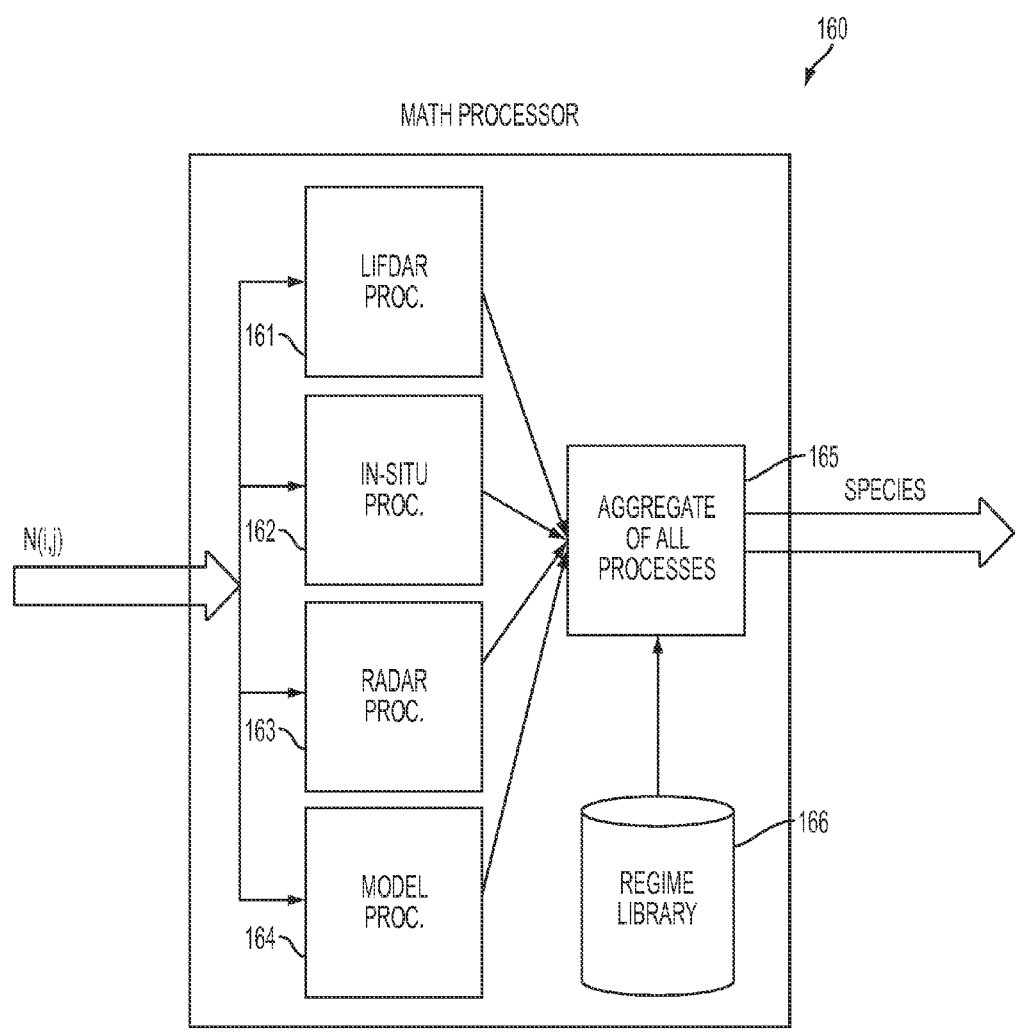
FIG. 16 is a block diagram of yet another math processor, in accordance with an embodiment of the present invention.

FIG. 16 depicts math processor 160 which receives diverse features, based on multiple regimes that do not compare well to each other. These regimes may be based upon datasets obtained by a LIFDAR system, a radar system that uses RF energy, and an image sensor. The diverse features are then processed by exemplary processors, such as LIFDAR processor 161, in-situ processor 162, radar processor 163 and model processor 164. A final processor, such as aggregate processor 165, receives the multiple determinations made from the aforementioned processors and provides a final determination of the identities of the detected species, including the datasets of tuples associated with each identified species. The library used for comparing stored features against the processed diverse features may be included internally, within the math processor, or may be provided externally. As shown, regime library 166 is included within the math processor for use by the aggregate processor, or by individual processors 161-164.

The math processors shown in FIGS. 13, 14 and 16 include fuzzy math and/or SVD algorithms. These are examples and other algorithms used by neural networks may be utilized along with other estimation and detection algorithms. These algorithms identify the weights, as shown in FIG. 13, for use by the several weight modules shown in FIG. 3. Learning algorithms may also be used, such as those used in neural networks. Eventually, a set of weights or a functional paradigm based on weighted observation is obtained to arrive at detected species with determined confidence levels, as shown in FIG. 17.

Figure 17:
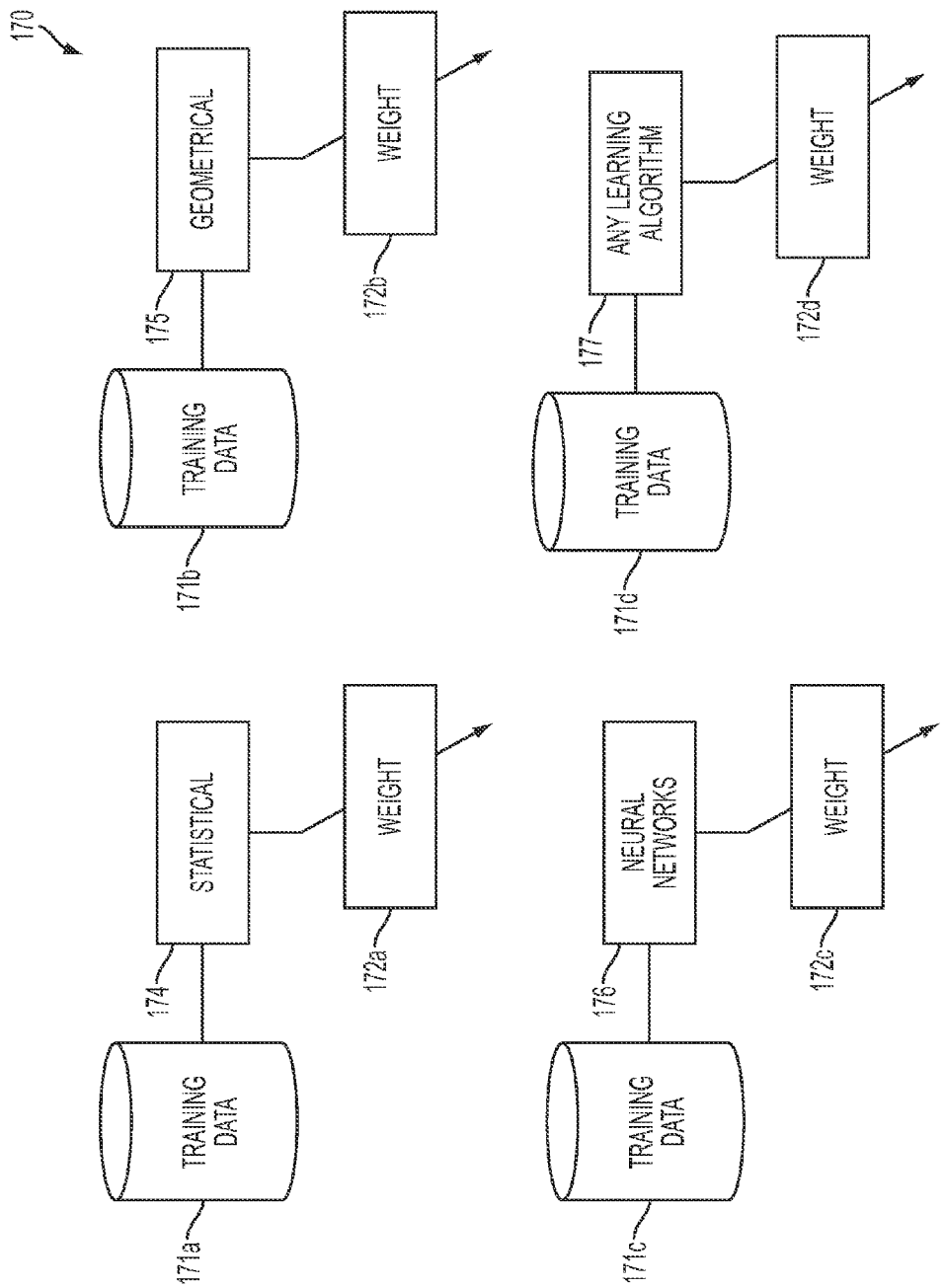
FIG. 17 is a block diagram of a system for determining weights for use in the math processor shown in FIG. 13, in accordance with an embodiment of the present invention.

FIG. 17 shows system 170 providing weight determinations for use by the math processors depicted in FIG. 13. The determined weights, designated as 172a through 172d are derived by diverse methods, including statistical methods using statistical algorithms 174, geometrical methods using geometrical algorithms 175, neural network algorithms 176 and other algorithms 177. Training data 171a through 171d are included to refine the final outputted weights.

Figure 18:
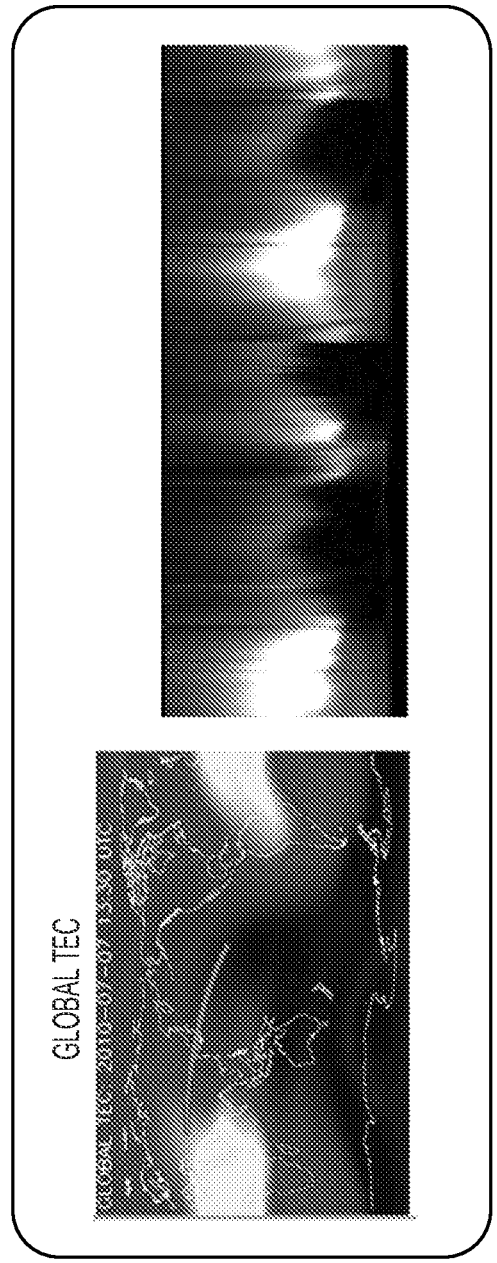
FIG. 18 shows visualization of space weather, in which the left side of the figure is an image of low definition and the right side of the figure is an image of high definition (HD).

Next, the ability of the present invention to provide high definition (HD) data to an end user is described. As defined herein, HD data are structures and patterns provided to the end user for visualization of space weather which are based on inputted raw data. This definition excludes any structure or pattern provided to the end user by way of simulation or modeling; and excludes situations in which a structure or pattern is inserted by one dataset and imposed onto something else by way of a model. FIG. 18 demonstrates an example of HD data contemplated by the present invention.

FIG. 18 shows an example of coarse and fine structures. On the left side of the figure is a TEC image covering most of the Earth. The structure in this TEC image is comparable to the structure of a solar event that has been captured with conventional space assets. The data captured by these space assets are inputted into a model to show the end user how the raw data interacts with the Earth. It will be appreciated that the visualized data is very coarse. In essence two huge smears are shown, one disposed on top of two continents and the other on top of an ocean. In contrast, the right side of FIG. 18 is a line scan of only one ionized species in the ionosphere, as may be sampled by the present invention in one spot of the sky over a large period of time. The area coverage with respect to the image on the left is a curved line (shown as a curved line spanning from the middle of Asia to the middle of the Pacific Ocean) depicting the rotation of the Earth. The vertical axis in the image on the right is height and the horizontal axis is time which signifies a traverse of the curved line. The fine structure and densities of the ionized species are apparent in the image, but clearly not shown.

Criteria for high definition data contemplated by the present invention comes from the physical characteristics of plasma. Temporally, geomagnetic fields vary at most on the order of 10 minute time scales (as measured by 1 minute measurements). To generate high definition plasma characteristics temporally, measurements are made under 10 minutes time scales and greater than 1 minute time scales. Spatially, geomagnetic fields vary on the order of 30-100 km (depending on altitude). Therefore, spatial high definition is defined approximately at 1-10 km per pixel.

Once this level of high definition is available, the level and data presentation, modeling and forecasting changes in ways that are not available today. Image generation from high definition data requires constant contextual analysis. Similar to mapping software where certain facets are related to certain viewing scales, high definition space weather image generation needs such contextual zoom features. It is obvious from the images shown in FIG. 18 that three dimensional structures in data may be considered. Currently, a three dimensional impact on space weather imaging is the spherical shape of the earth and not the height of the detected species.

In addition, modeling of effects for high definition data changes dramatically. Considering only the case of finite element analysis, the granularity of elements reduces to a level in which species characteristics are used instead of macro-level characteristics. Currently, one of the major characteristics used in space weather are the magnetic lines and the direction of the solar storms. Improvements in modeling contemplated by the present invention will provide a higher level of detail on how species interact with each other and how the structures in the datasets influence outcomes.

Figure 19:
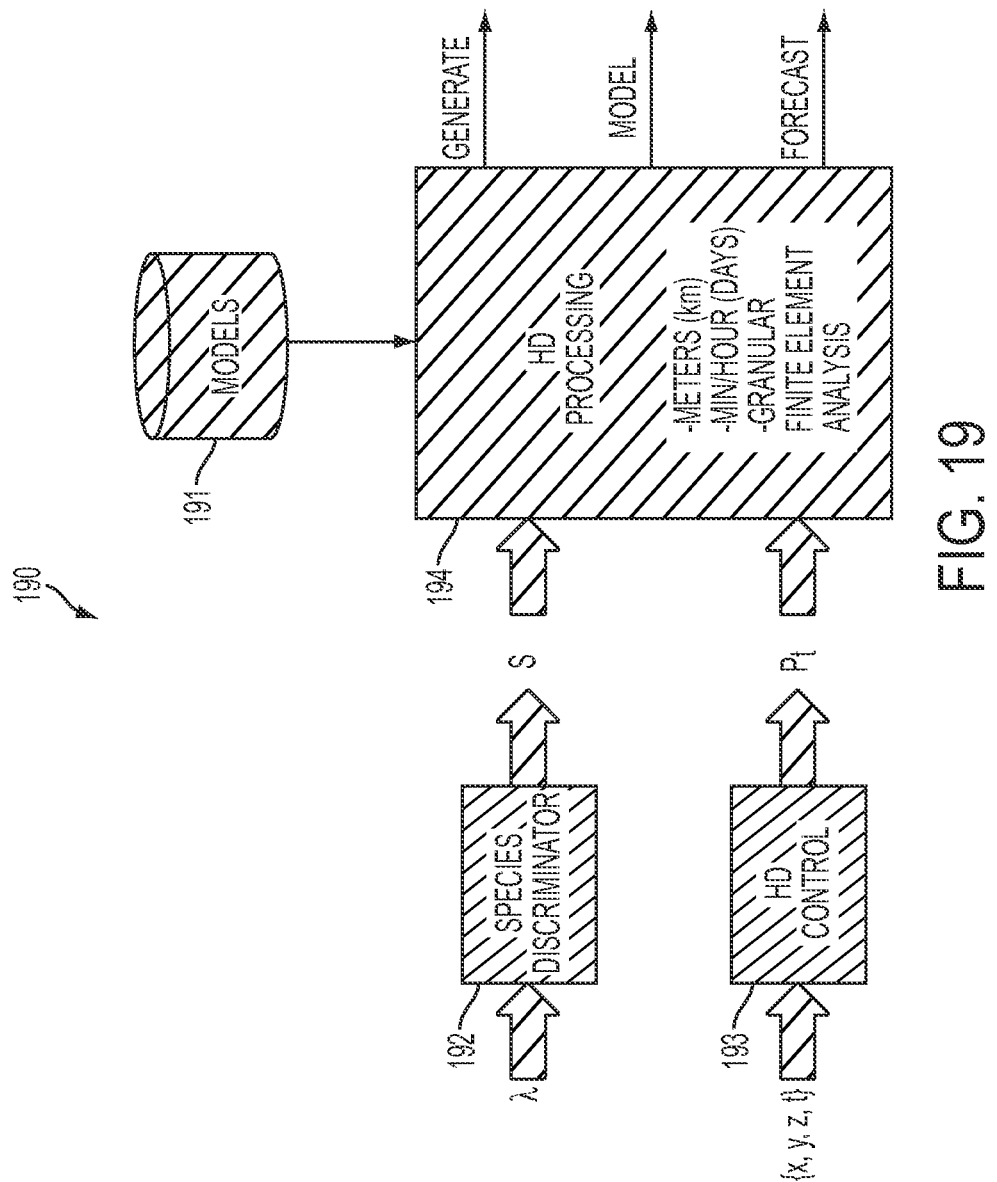
FIG. 19 is a block diagram of a visualization system providing control to an HD processor for generating high definition data for visualization of space weather, in accordance with an embodiment of the present invention.

FIG. 19 depicts a process model for HD processing contemplated by the present invention. The process model, designated as 190, includes species discriminator 192, HD controller 193 and HD processor 194. In essence, the species discriminator may be similar to the systems described with respect to FIGS. 10-16. The species discriminator includes various spectral responses, denoted by $\lambda$, that may be obtained by a LIFDAR system (for example). The outputs from the discriminator include the multiple species, S. These species are identified and each is then associated with a dataset of tuples {x, y, z, t, d}. The identification of the species and the segmentation of the datasets of tuples are provided by the math processor, which acts upon the multiple features used by the present invention as they are compared against data in a feature library and individually weighted.

The HD controller 193 provides the necessary high definition control in four dimensions of {x, y, z, t} in order to produce dynamic points, $P_t$, so that multitudes of species may be tracked temporally and spatially at a high resolution.

The HD processor generates the space weather forecast by presenting various structures and patterns of data to the end user commensurate with his needs. The HD controller is utilized to vary the granularity of the output data as a function of such variables as distance resolution in meters, time resolution in hours or days, etc.

Figure 20:
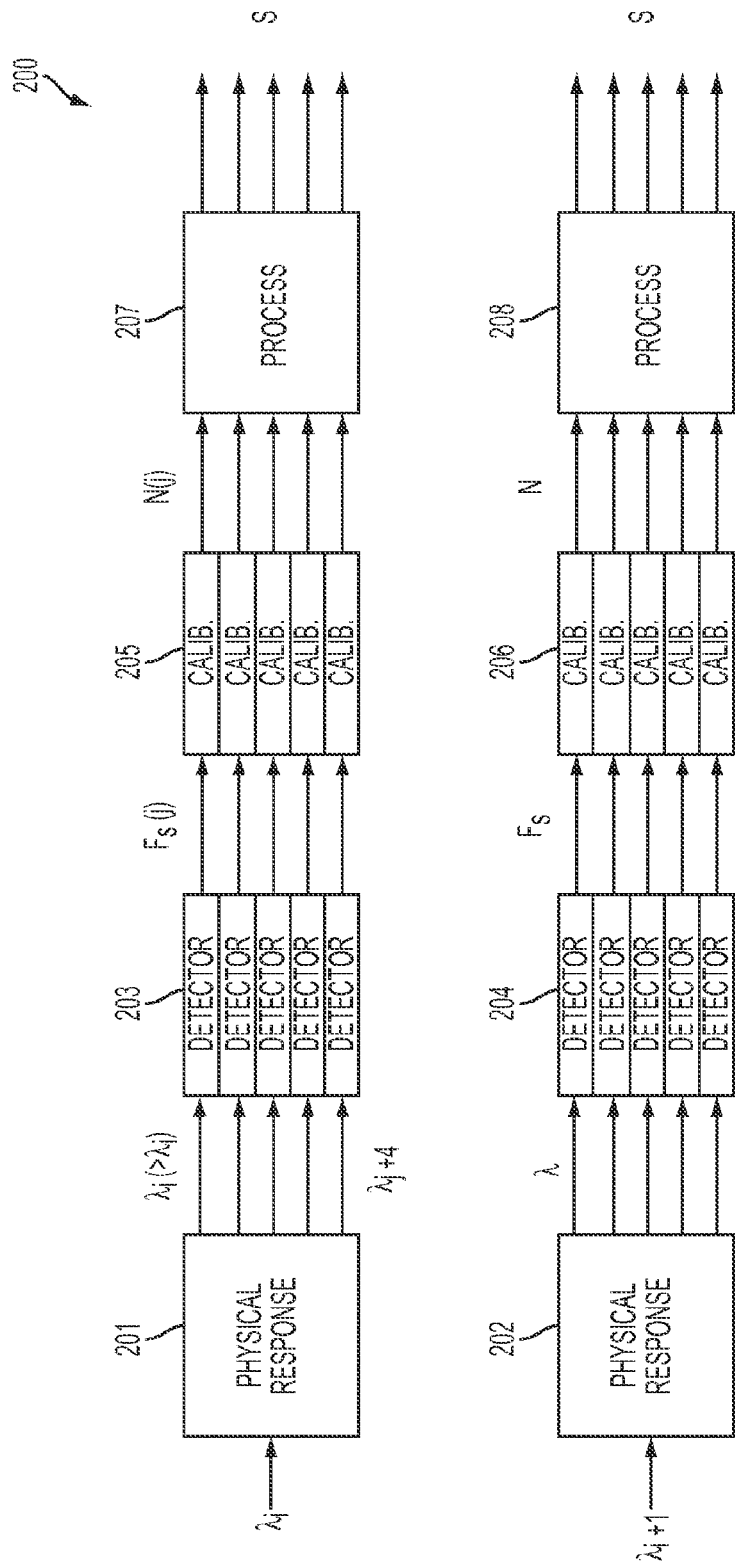
FIG. 20 is a block diagram of another species identification system including multiple regimes providing various spectral responses that are detected, calibrated and classified by various processors, in accordance with an embodiment of the present invention.

Turning lastly to FIG. 20, there is shown a generalized system 200 for detecting, calibrating and processing responses from multiple regimes in order to provide identification and segmentation of multiple species of S, where each species S includes the identity of the species (at a predetermined probability) and its associated dataset of tuples {x, y, z, t, d}. The output datasets of S may be provided to the end user in a desired format that is generated by the HD processor depicted in FIG. 19. System 200 includes multiple regimes, shown as physical system responses 201 and 202. Each regime 201, 202 may include a LIFDAR system, an RF radar system, a hyper-spectral system, etc. . . . These regimes may also include in-situ instruments, such as interferometers, etc., for processing data of a specific cloud of species or plasma. These regimes may also include a model used to represent a species or plasma in outer space.

The outputs from the physical systems are detected, by filtering and other techniques, into multiple wavelengths using several detectors operating on each physical system response. For example, the set of detectors 203 operate on physical system responses from module 201 and the set of detectors 204 operate on physical system responses from module 202. In case of LIFDAR physical responses, for example, multiple sets of detectors provide sets of fluorescence signals denoted as $F_s$ (shown in Equation 2). The outputs from each set of detectors are then calibrated by modules 205 and 206. Each calibration module 205, 206 includes a different set of calibration equations. For example, in case of a LIFDAR physical response, each set of calibration modules 205 and 206 includes LIDAR equations that provide density outputs of at least one species as a function of range and time (shown in Equation 2 as calibrated by the system shown in FIG. 11).

The multiple density outputs of N(j) are then processed by different sets of processors 207 and 208. These processors may include algorithms using fuzzy math, SVD, PCA, neural networks and other algorithms in order to estimate densities of at least one species and the various states of each species identified. For example, in case of a LIFDAR physical response, processor 207 or 208 may include the Boltzmann-Saha algorithm. These processors 207 and 208 may be thought of as classification processors that provide outputs of identified and segmented species, where each species includes a dataset of tuples {x, y, z, t, d}.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A system for visualization of space weather comprising:
a regime module for processing returned signals from at least one species in space and providing multiple output responses based on the returned signals,
a classification processor for providing identification of the at least one species in space, and associating the multiple output responses with the at least one species, and
a high definition (HD) processor for receiving the associated multiple output responses with the identified at least one species and providing visualization of the at least one species to a user.

2. The system of claim 1 wherein
the regime module includes a laser induced fluorescence detection and ranging (LIFDAR) system for transmitting multiple wavelength signals toward the at least one species and providing the multiple output responses, and
a calibration module, disposed between the regime module and the classification processor, for calibrating the multiple output responses and providing densities of the at least one species as a function of range to the species.

3. The system of claim 2 wherein
the classification processor includes multiple parameter modules, in which each parameter module determines one of either traces, abundance, or existence of the at least one species based on the output responses provided from the calibration module, and
includes at least one weighting module for receiving output determinations from the parameter modules and providing a weighted probability of existence of the at least one species as a function of range.

4. The system of claim 3 wherein
the classification processor provides a dataset of the at least one species as an output to the HD processor, including multiple tuples of {x, y, z, t, d}, where the tuple of {x, y, z} is three dimensional location of the at least one species, {t} is time and {d} is density.

5. The system of claim 4 including
an HD controller for providing dynamic point control to the HD processor, and
the HD processor is configured to receive the multiple tuples from the classification processor and generate an image of the at least one species to the user.

6. The system of claim 5 wherein
the dynamic point control to the HD processor is controlled by the user.

7. The system of claim 2 wherein
the classification processor includes a Boltzmann-Saha algorithm for providing the identification of the at least one species.

8. The system of claim 1 including
another regime module for processing returned signals from another species in space and providing additional multiple output responses based on the returned signals.

9. The system of claim 8 wherein
the other regime module includes one of either a LIFDAR system, a radar system or an imaging system.

10. The system of claim 1 wherein
the classification processor includes a fuzzy math algorithm, a singular value decomposition (SVD) algorithm, or a neural network algorithm.

11. A system for identifying at least one species in space comprising:
- a physical response module for outputting multiple spectral data based on received signals from a target in space,
- a calibration module for receiving the spectral data and outputting a first dataset, including density of an $\{x, y, z\}$ coordinate location in space as a function of time, t, and
- a classification module for receiving the first dataset, and outputting a second dataset including
- multiple tuples of $\{x, y, z, t, d\}$ associated with the at least one species, wherein d is density of the at least one species.

12. The system of claim 11 wherein
the physical response module includes one of either a LIFDAR system, a radar system, an imaging system, and an in-situ processing system.

13. The system of claim 11 wherein
the calibration module includes a LIDAR algorithm for determining the first dataset.

14. The system of claim 11 wherein
the classification system includes a Boltzmann-Saha algorithm, a fuzzy math algorithm, an SVD algorithm or a neural network algorithm.

15. The system of claim 11 wherein the physical response module, the calibration module and the classification module are, respectively, a first physical response module, a first calibration module and a first classification module, and the system further includes:
- a second physical response module including one of either another LIFDAR system, another radar system, another imaging system, or another in-situ processing system, and
- a second classification module including one of either another Boltzmann-Saha algorithm, another fuzzy math algorithm, another SVD algorithm or a neural network algorithm,
- wherein the second classification module outputs a second dataset including
- multiple tuples of $\{x, y, z, t, d\}$ associated with a second species, and d is density of the second species.

16. The system of claim 11 wherein
the classification module includes statistical weighting parameters configured to operate on the first dataset and provide a probability associated with the existence of the at least one species.

17. The system of claim 11 including
an HD processor for receiving the second dataset from the classification module and providing a visual image of the second dataset to a user.

18. The system of claim 11 wherein
the classification module includes a feature recognition algorithm for comparing the first dataset with a library of predetermined spectral intensities and estimating existence of the at least one species.

19. The system of claim 11 wherein
the calibration module includes a range correction module and an extinction correction module configured to operate on the spectral data and subsequently provide the first dataset as an output.

20. The system of claim 11 wherein
a summer is included for receiving the second dataset and providing a total electron count for the at least one species.

* * * * *